United States Patent
Iyer et al.

(10) Patent No.: US 11,797,624 B2
(45) Date of Patent: Oct. 24, 2023

(54) PERSONALIZED RANKING USING DEEP ATTRIBUTE EXTRACTION AND ATTENTIVE USER INTEREST EMBEDDINGS

(71) Applicant: Walmart Apollo, LLC, Bentonville, AR (US)

(72) Inventors: Rahul Iyer, Santa Clara, CA (US); Soumya Wadhwa, Sunnyvale, CA (US); Surya Prasanna Kumar, Sunnyvale, CA (US); Praveenkumar Kanumala, Newark, CA (US); Stephen Dean Guo, Saratoga, CA (US); Kannan Achan, Saratoga, CA (US); Rahul Ramkumar, Santa Clara, CA (US)

(73) Assignee: Walmart Apollo, LLC, Bentonville, AR (US)

( * ) Notice: Subject to any disclaimer, the term of this patent is extended or adjusted under 35 U.S.C. 154(b) by 0 days.

(21) Appl. No.: 17/696,461

(22) Filed: Mar. 16, 2022

(65) Prior Publication Data
US 2022/0207101 A1    Jun. 30, 2022

Related U.S. Application Data

(63) Continuation of application No. 16/527,513, filed on Jul. 31, 2019, now Pat. No. 11,321,406.

(51) Int. Cl.
| | |
|---|---|
| *G06F 16/9535* | (2019.01) |
| *G06N 3/049* | (2023.01) |
| *G06F 16/903* | (2019.01) |

(52) U.S. Cl.
CPC .... *G06F 16/9535* (2019.01); *G06F 16/90344* (2019.01); *G06N 3/049* (2013.01)

(58) Field of Classification Search
CPC ............. G06F 16/9535; G06F 16/90344
See application file for complete search history.

(56) References Cited

U.S. PATENT DOCUMENTS

| | | | |
|---|---|---|---|
| 8,429,026 B1 | 4/2013 | Kolawa et al. | |
| 9,741,039 B2 | 8/2017 | Abbas | |
| 11,004,135 B1 * | 5/2021 | Sandler | G06Q 30/0631 |
| 2003/0074368 A1 | 4/2003 | Schuetze et al. | |

(Continued)

OTHER PUBLICATIONS

Ming He et al., "HI2Rec: Exploring Knowledge in Heterogeneous Information for Movie Recommendation," IEEE Access, vol. 7, (2019), pp. 30276-30284.

*Primary Examiner* — Grace Park
(74) *Attorney, Agent, or Firm* — Morgan, Lewis & Bockius LLP; Manita Rawat

(57) ABSTRACT

In some examples, a system may be configured to generate one or more query attributes for a search query received from a computing device of a user. Additionally, the system may be configured to, based at least in part on historical data of the user including data characterizing one or more items associated with the user, generate relevant item data. In various examples, the relevant item data characterizing a set of relevant items. Moreover, the system may be configured to, based on the relevant item data, the historical data of the user and the one or more query attributes, implement a set of operations that generate a set of personalized search results associated with the search query.

20 Claims, 15 Drawing Sheets

(56) References Cited

U.S. PATENT DOCUMENTS

| | | | |
|---|---|---|---|
| 2009/0240358 A1 | 9/2009 | Ogasawara et al. | |
| 2011/0145175 A1* | 6/2011 | Agarwal | G06N 20/10 |
| | | | 706/12 |
| 2012/0030159 A1 | 2/2012 | Pilászy et al. | |
| 2014/0222505 A1 | 8/2014 | Tuzhilin et al. | |
| 2015/0161178 A1 | 6/2015 | Bădoiu | |
| 2015/0186535 A1 | 7/2015 | Patil et al. | |
| 2016/0360336 A1 | 12/2016 | Gross et al. | |
| 2016/0371376 A1 | 12/2016 | Hassan et al. | |
| 2017/0372199 A1 | 12/2017 | Hakkani-Tur et al. | |
| 2018/0157760 A1* | 6/2018 | Garg | G06F 16/9535 |
| 2019/0004533 A1 | 1/2019 | Huang et al. | |
| 2019/0050494 A1 | 2/2019 | Rao et al. | |
| 2019/0065867 A1 | 2/2019 | Huang et al. | |
| 2019/0130073 A1 | 5/2019 | Sun et al. | |
| 2019/0139092 A1* | 5/2019 | Nomula | G06Q 30/0255 |
| 2019/0171689 A1* | 6/2019 | Kachkach | G06F 16/9535 |
| 2019/0205964 A1 | 7/2019 | Onoro Rubio et al. | |
| 2020/0193141 A1 | 6/2020 | Tan et al. | |

\* cited by examiner

PERSONALIZED RANKING USING DEEP ATTRIBUTE EXTRACTION AND ATTENTIVE USER INTEREST EMBEDDINGS

CROSS-REFERENCE TO RELATED APPLICATIONS

This application is a continuation of U.S. patent application Ser. No. 16/527,513 filed Jul. 31, 2019, the aforementioned priority application being hereby fully incorporated by reference in its entirety.

TECHNICAL FIELD

This application relates generally to system and methods for generating ranked searched results and, more particularly, to generating personalized search results for individual users.

BACKGROUND

Users interact with e-commerce interfaces, such as e-commerce websites, to select and purchase items from the inventory of the e-commerce interface. A user may add one or more items to a virtual cart after performing a search. For example, a user may search for "throw pillows" and receive a result set containing throw pillows from the e-commerce inventory. A user may have to review multiple items before finding one or more items that match the user's preferences, such as style, price, color, etc.

However, when interacting with an e-commerce platform through an input other than a traditional visual web client, for example through voice input, the e-commerce platform must present each result to the user through a corresponding alternative output, such as text-to-speech systems. Users do not have the ability or patience to review potentially hundreds of listings to identify the desired product when using interface systems such as speech-based systems.

SUMMARY

In some embodiments, a system for providing user search results including a computing device is disclosed. The computing device is configured to receive a search query including one or more words and generate a set of relevance-based search results in response to the search query. The computing device is further configured to generate one or more query attributes for the search query. The computing device receives historic data for a user associated with the search query and generates a set of personalized search results from the set of relevance-based search results based on the query attributes and one or more attributes associated with the historic data for the user. The historic data includes one or more items associated with the user.

In some embodiments, a non-transitory computer readable medium having instructions stored thereon is disclosed. The instructions, when executed by a processor cause a device to perform operations including receiving a search query including one or more words and generating a set of relevance-based search results in response to the search query. The operations further include generating one or more query attributes for the search query. The processor is further configured to receive historic data for a user associated with the search query and generate a set of personalized search results from the set of relevance-based search results based on the query attributes and one or more attributes associated with the historic data for the user. The historic data includes one or more items associated with the user.

In some embodiments, a method is disclosed. The method includes steps of receiving a search query including one or more words and generating a set of relevance-based search results in response to the search query. One or more query attributes are generated for the search query. Historic data for a user associated with the search query is received and a set of personalized search results is generated from the set of relevance-based search results based on the query attributes and one or more attributes associated with the historic data for the user. The historic data includes one or more items associated with the user.

BRIEF DESCRIPTION OF THE DRAWINGS

The features and advantages of the present invention will be more fully disclosed in, or rendered obvious by the following detailed description of the preferred embodiments, which are to be considered together with the accompanying drawings wherein like numbers refer to like parts and further wherein.

DETAILED DESCRIPTION

Figure 1:
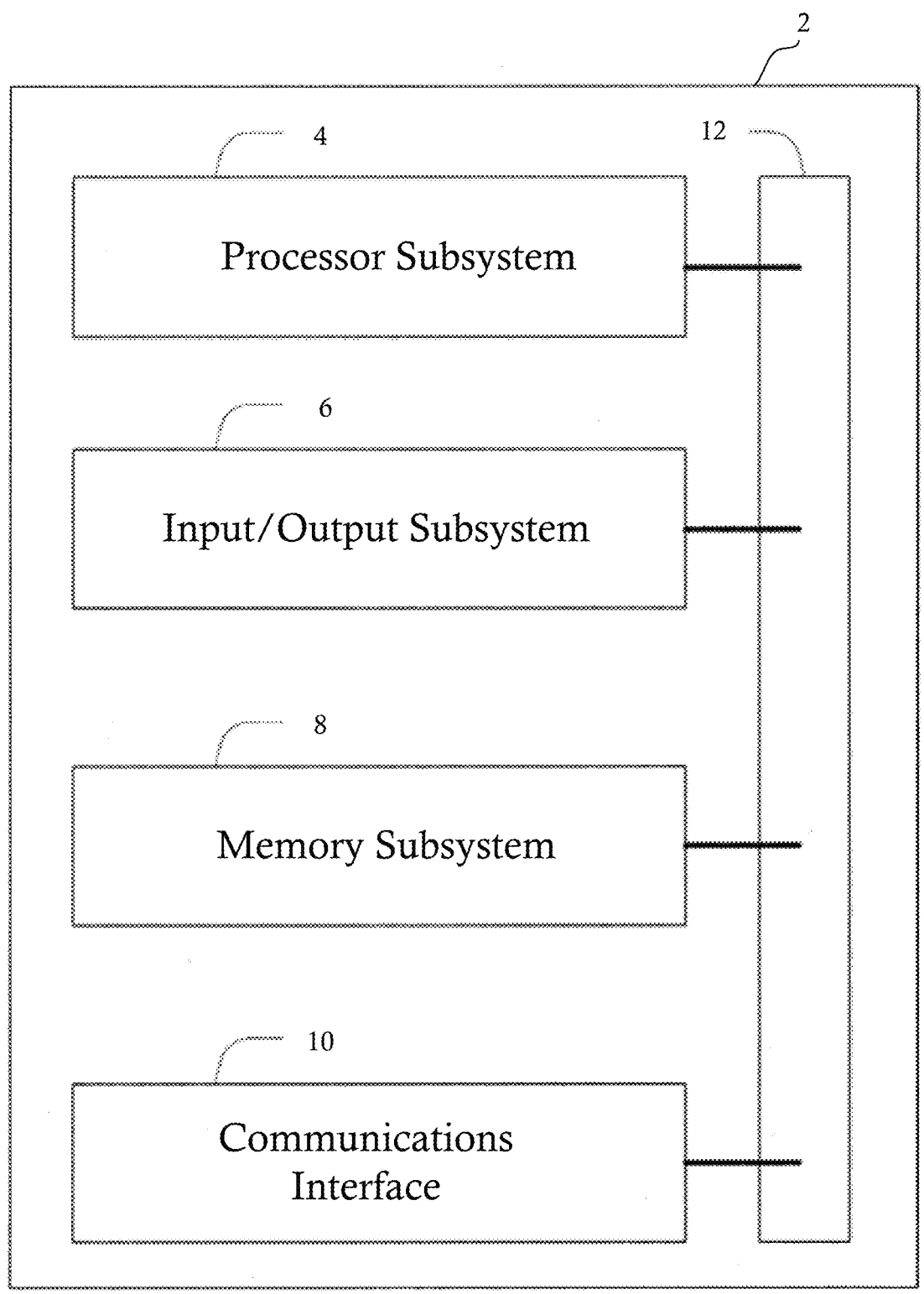
FIG. 1 illustrates a block diagram of a computer system, in accordance with some embodiments.

The description of the preferred embodiments is intended to be read in connection with the accompanying drawings, which are to be considered part of the entire written description of this invention. The drawing figures are not necessarily to scale and certain features of the invention may be shown exaggerated in scale or in somewhat schematic form in the interest of clarity and conciseness. In this description, relative terms such as "horizontal," "vertical," "up," "down," "top," "bottom," as well as derivatives thereof (e.g., "horizontally," "downwardly," "upwardly," etc.) should be construed to refer to the orientation as then described or as shown in the drawing figure under discussion. These relative terms are for convenience of description and normally are not intended to require a particular orientation. Terms including "inwardly" versus "outwardly," "longitudinal" versus "lateral" and the like are to be interpreted relative to one another or relative to an axis of elongation, or an axis or center of rotation, as appropriate. Terms concerning attachments, coupling and the like, such as "connected" and "interconnected," refer to a relationship wherein structures are secured or attached to one another either directly or indirectly through intervening structures, as well as both moveable or rigid attachments or relationships, unless expressly described otherwise. The term "operatively coupled" is such an attachment, coupling, or connection that allows the pertinent structures to operate as intended by virtue of that relationship. In the claims, means-plus-function clauses, if used, are intended to cover structures described, suggested, or rendered obvious by the written description or drawings for performing the recited function, including not only structure equivalents but also equivalent structures.

FIG. 1 illustrates a computer system configured to implement one or more processes, in accordance with some embodiments. The system 2 is a representative device and may comprise a processor subsystem 4, an input/output subsystem 6, a memory subsystem 8, a communications interface 10, and a system bus 12. In some embodiments, one or more than one of the system 2 components may be combined or omitted such as, for example, not including an input/output subsystem 6. In some embodiments, the system 2 may comprise other components not combined or comprised in those shown in FIG. 1. For example, the system 2 may also include, for example, a power subsystem. In other embodiments, the system 2 may include several instances of the components shown in FIG. 1. For example, the system 2 may include multiple memory subsystems 8. For the sake of conciseness and clarity, and not limitation, one of each of the components is shown in FIG. 1.

The processor subsystem 4 may include any processing circuitry operative to control the operations and performance of the system 2. In various aspects, the processor subsystem 4 may be implemented as a general purpose processor, a chip multiprocessor (CMP), a dedicated processor, an embedded processor, a digital signal processor (DSP), a network processor, an input/output (I/O) processor, a media access control (MAC) processor, a radio baseband processor, a co-processor, a microprocessor such as a complex instruction set computer (CISC) microprocessor, a reduced instruction set computing (RISC) microprocessor, and/or a very long instruction word (VLIW) microprocessor, or other processing device. The processor subsystem 4 also may be implemented by a controller, a microcontroller, an application specific integrated circuit (ASIC), a field programmable gate array (FPGA), a programmable logic device (PLD), and so forth.

In various aspects, the processor subsystem 4 may be arranged to run an operating system (OS) and various applications. Examples of an OS comprise, for example, operating systems generally known under the trade name of Apple OS, Microsoft Windows OS, Android OS, Linux OS, and any other proprietary or open source OS. Examples of applications comprise, for example, network applications, local applications, data input/output applications, user interaction applications, etc.

In some embodiments, the system 2 may comprise a system bus 12 that couples various system components including the processing subsystem 4, the input/output subsystem 6, and the memory subsystem 8. The system bus 12 can be any of several types of bus structure(s) including a memory bus or memory controller, a peripheral bus or external bus, and/or a local bus using any variety of available bus architectures including, but not limited to, 9-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect Card International Association Bus (PCMCIA), Small Computers Interface (SCSI) or other proprietary bus, or any custom bus suitable for computing device applications.

In some embodiments, the input/output subsystem 6 may include any suitable mechanism or component to enable a user to provide input to system 2 and the system 2 to provide output to the user. For example, the input/output subsystem 6 may include any suitable input mechanism, including but not limited to, a button, keypad, keyboard, click wheel, touch screen, motion sensor, microphone, camera, etc.

In some embodiments, the input/output subsystem 6 may include a visual peripheral output device for providing a display visible to the user. For example, the visual peripheral output device may include a screen such as, for example, a Liquid Crystal Display (LCD) screen. As another example, the visual peripheral output device may include a movable display or projecting system for providing a display of content on a surface remote from the system 2. In some embodiments, the visual peripheral output device can include a coder/decoder, also known as Codecs, to convert digital media data into analog signals. For example, the visual peripheral output device may include video Codecs, audio Codecs, or any other suitable type of Codec.

The visual peripheral output device may include display drivers, circuitry for driving display drivers, or both. The visual peripheral output device may be operative to display content under the direction of the processor subsystem 6. For example, the visual peripheral output device may be able to play media playback information, application screens for application implemented on the system 2, information regarding ongoing communications operations, information regarding incoming communications requests, or device operation screens, to name only a few.

In some embodiments, the communications interface 10 may include any suitable hardware, software, or combination of hardware and software that is capable of coupling the system 2 to one or more networks and/or additional devices. The communications interface 10 may be arranged to operate with any suitable technique for controlling information signals using a desired set of communications protocols, services or operating procedures. The communications interface 10 may comprise the appropriate physical connectors to connect with a corresponding communications medium, whether wired or wireless.

Vehicles of communication comprise a network. In various aspects, the network may comprise local area networks (LAN) as well as wide area networks (WAN) including without limitation Internet, wired channels, wireless channels, communication devices including telephones, computers, wire, radio, optical or other electromagnetic channels, and combinations thereof, including other devices and/or components capable of/associated with communicating data. For example, the communication environments comprise in-body communications, various devices, and various modes of communications such as wireless communications, wired communications, and combinations of the same.

Wireless communication modes comprise any mode of communication between points (e.g., nodes) that utilize, at least in part, wireless technology including various protocols and combinations of protocols associated with wireless transmission, data, and devices. The points comprise, for example, wireless devices such as wireless headsets, audio and multimedia devices and equipment, such as audio players and multimedia players, telephones, including mobile telephones and cordless telephones, and computers and computer-related devices and components, such as printers, network-connected machinery, and/or any other suitable device or third-party device.

Wired communication modes comprise any mode of communication between points that utilize wired technology including various protocols and combinations of protocols associated with wired transmission, data, and devices. The points comprise, for example, devices such as audio and multimedia devices and equipment, such as audio players and multimedia players, telephones, including mobile telephones and cordless telephones, and computers and computer-related devices and components, such as printers, network-connected machinery, and/or any other suitable device or third-party device. In various implementations, the wired communication modules may communicate in accordance with a number of wired protocols. Examples of wired protocols may comprise Universal Serial Bus (USB) communication, RS-232, RS-422, RS-423, RS-485 serial protocols, FireWire, Ethernet, Fibre Channel, MIDI, ATA, Serial ATA, PCI Express, T-1 (and variants), Industry Standard Architecture (ISA) parallel communication, Small Computer System Interface (SCSI) communication, or Peripheral Component Interconnect (PCI) communication, to name only a few examples.

Accordingly, in various aspects, the communications interface 10 may comprise one or more interfaces such as, for example, a wireless communications interface, a wired communications interface, a network interface, a transmit interface, a receive interface, a media interface, a system interface, a component interface, a switching interface, a chip interface, a controller, and so forth. When implemented by a wireless device or within wireless system, for example, the communications interface 10 may comprise a wireless interface comprising one or more antennas, transmitters, receivers, transceivers, amplifiers, filters, control logic, and so forth.

In various aspects, the communications interface 10 may provide data communications functionality in accordance with a number of protocols. Examples of protocols may comprise various wireless local area network (WLAN) protocols, including the Institute of Electrical and Electronics Engineers (IEEE) 802.xx series of protocols, such as IEEE 802.11a/b/g/n, IEEE 802.16, IEEE 802.20, and so forth. Other examples of wireless protocols may comprise various wireless wide area network (WWAN) protocols, such as GSM cellular radiotelephone system protocols with GPRS, CDMA cellular radiotelephone communication systems with 1×RTT, EDGE systems, EV-DO systems, EV-DV systems, HSDPA systems, and so forth. Further examples of wireless protocols may comprise wireless personal area network (PAN) protocols, such as an Infrared protocol, a protocol from the Bluetooth Special Interest Group (SIG) series of protocols (e.g., Bluetooth Specification versions 5.0, 6, 7, legacy Bluetooth protocols, etc.) as well as one or more Bluetooth Profiles, and so forth. Yet another example of wireless protocols may comprise near-field communication techniques and protocols, such as electro-magnetic induction (EMI) techniques. An example of EMI techniques may comprise passive or active radio-frequency identification (RFID) protocols and devices. Other suitable protocols may comprise Ultra Wide Band (UWB), Digital Office (DO), Digital Home, Trusted Platform Module (TPM), ZigBee, and so forth.

In some embodiments, at least one non-transitory computer-readable storage medium is provided having computer-executable instructions embodied thereon, wherein, when executed by at least one processor, the computer-executable instructions cause the at least one processor to perform embodiments of the methods described herein. This computer-readable storage medium can be embodied in memory subsystem 8.

In some embodiments, the memory subsystem 8 may comprise any machine-readable or computer-readable media capable of storing data, including both volatile/non-volatile memory and removable/non-removable memory. The memory subsystem 8 may comprise at least one non-volatile memory unit. The non-volatile memory unit is capable of storing one or more software programs. The software programs may contain, for example, applications, user data, device data, and/or configuration data, or combinations therefore, to name only a few. The software programs may contain instructions executable by the various components of the system 2.

In various aspects, the memory subsystem 8 may comprise any machine-readable or computer-readable media capable of storing data, including both volatile/non-volatile memory and removable/non-removable memory. For example, memory may comprise read-only memory (ROM), random-access memory (RAM), dynamic RAM (DRAM), Double-Data-Rate DRAM (DDR-RAM), synchronous DRAM (SDRAM), static RAM (SRAM), programmable ROM (PROM), erasable programmable ROM (EPROM), electrically erasable programmable ROM (EEPROM), flash memory (e.g., NOR or NAND flash memory), content addressable memory (CAM), polymer memory (e.g., ferroelectric polymer memory), phase-change memory (e.g., ovonic memory), ferroelectric memory, silicon-oxide-nitride-oxide-silicon (SONOS) memory, disk memory (e.g., floppy disk, hard drive, optical disk, magnetic disk), or card (e.g., magnetic card, optical card), or any other type of media suitable for storing information.

In one embodiment, the memory subsystem 8 may contain an instruction set, in the form of a file for executing various methods, such as methods including A/B testing and cache optimization, as described herein. The instruction set may be stored in any acceptable form of machine readable instructions, including source code or various appropriate programming languages. Some examples of programming languages that may be used to store the instruction set comprise, but are not limited to: Java, C, C++, C#, Python, Objective-C, Visual Basic, or .NET programming. In some embodiments a compiler or interpreter is comprised to convert the instruction set into machine executable code for execution by the processing subsystem 4.

Figure 2:
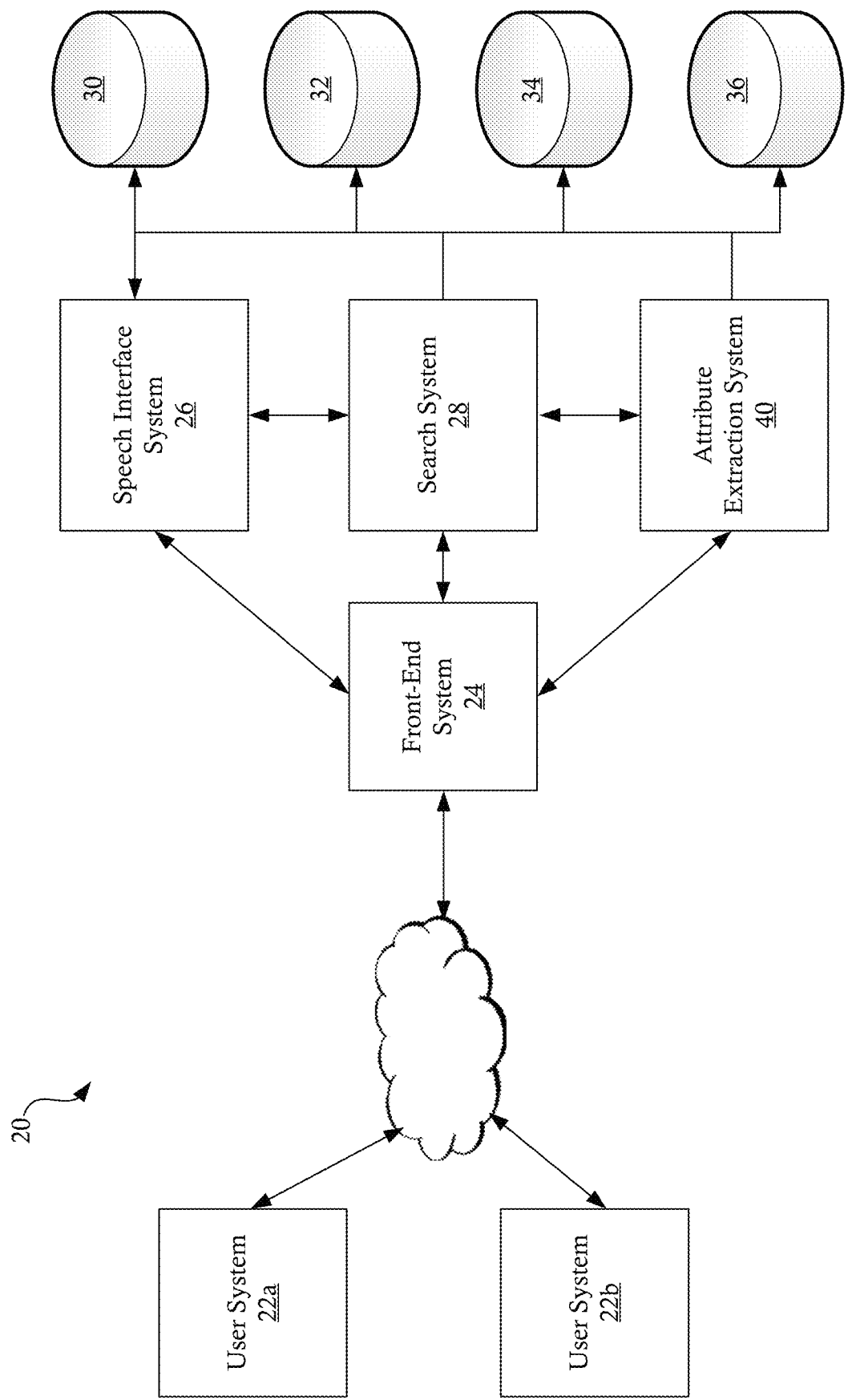
FIG. 2 illustrates a network configured to generate personalized search results for individual users, in accordance with some embodiments.

FIG. 2 illustrates a network 20 configured to generate personalized search results for individual users, in accordance with some embodiments. The network 20 includes a plurality of user systems 22a, 22b configured to interact with a front-end system 24 using a non-visual based interface, such as, for example, a speech-based interface. The user systems 22a, 22b may include any suitable user systems, such as, for example, a personal computer, a smart-home system (e.g., Google Home system, Amazon Alexa-based system, Apple HomePod, etc.), a mobile device, and/or any other suitable device. The front-end system 24 may include any suitable system, such as a web server, cloud server, etc.

In some embodiments, the front-end system 24 is in signal communication with a speech interface system 26, a search system 28, and/or an attribute extraction system 40. Although the illustrated embodiment includes front-end system 24, speech interface system 26, search system 28, and attribute extraction system 40 as different systems, it will be appreciated that any of the systems, alternative systems, and/or additional systems may be combined, separated, and/or otherwise included in the network 20. The speech interface system 26 may be configured to provide speech interface services, such as, for example, speech recognition, text-to-voice generation, and/or any other suitable voice interface system. In some embodiments, the speech interface system 26 is integrated into a user system 22a, 22b, the front-end system 24, and/or any other suitable system. The speech interface system 26 is configured to receive a voice query from a user (via the user system 22a, 22b and/or the front-end system 24) and convert the voice search to a query executable by the search system 28.

In some embodiments, the search system 28 is configured to generate user-personalized search results for each user and/or associated user system 22a, 22b for the user query. The search system 28 is configured to execute a search of an inventory of items, such as an e-commerce inventory maintained by inventory database 30, to generate a non-personalized relevance-based search result for the user query. In some embodiments, the inventory database 30 is limited to a predetermined set of items, such as, for example, grocery items. The non-personalized relevant-based search results may be generated using any suitable search algorithm. The search system 28 is further configured to obtain items related to the user query that are user-specific, such as, for example, previously purchased items. The search system 28 combines the non-personalized relevance-based search results and the user-related items to generate user-personalized search results for the user. In some embodiments, past-purchase data is maintained in a user information database 32.

Figure 3:
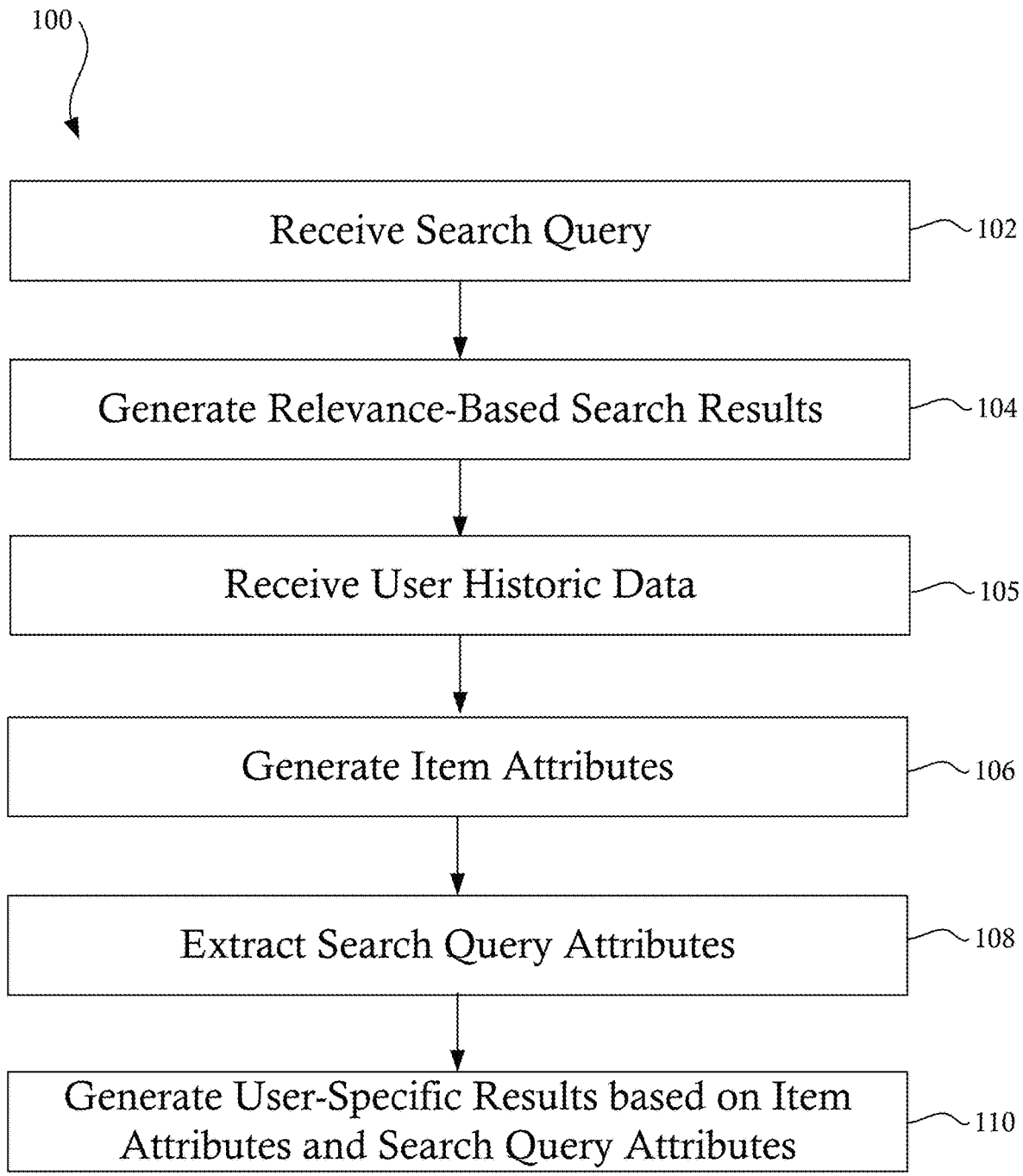
FIG. 3 illustrates a method of generating user personalized search results, in accordance with some embodiments.
Figure 4:
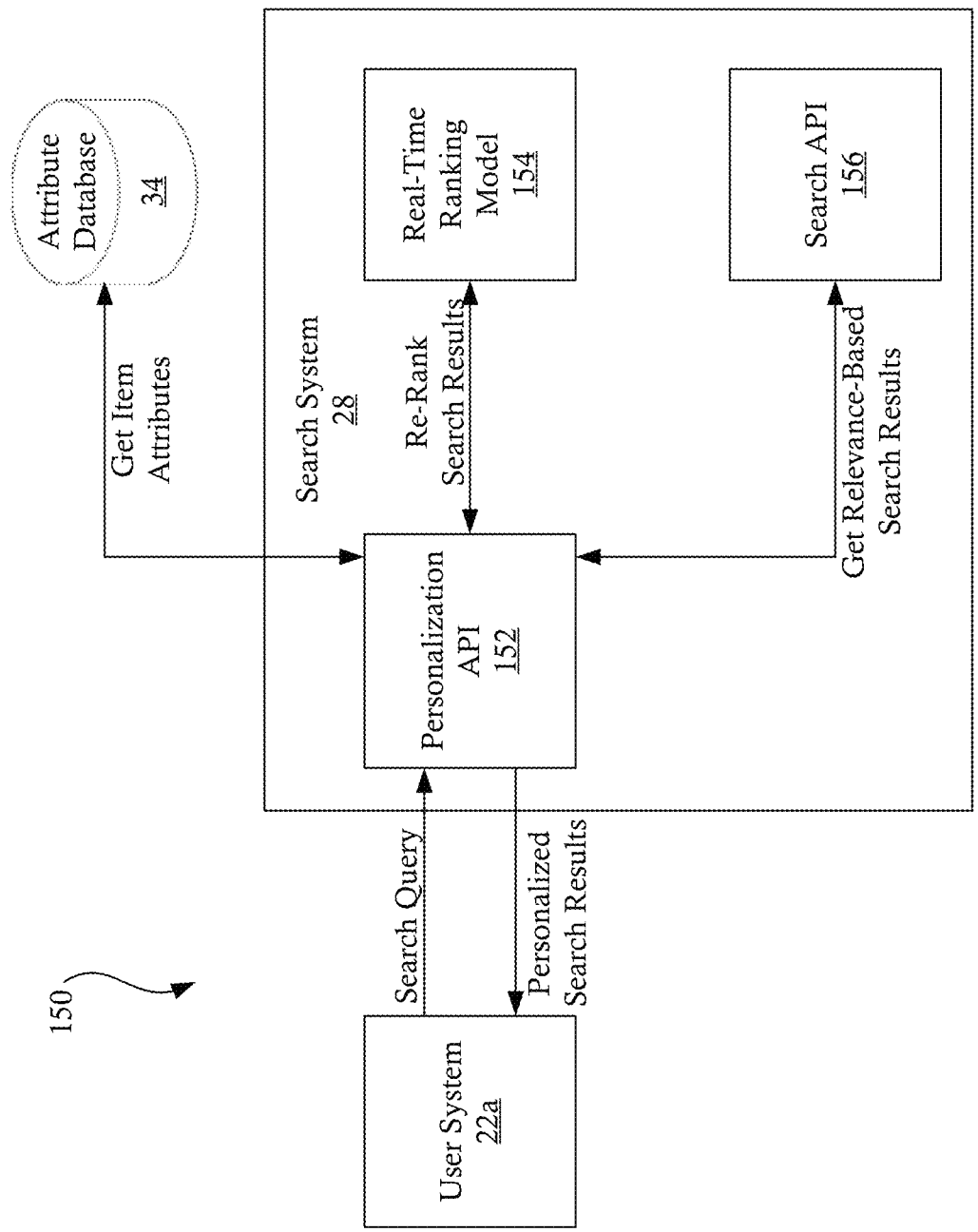
FIG. 4 illustrates a system architecture for executing the method of FIG. 3, in accordance with some embodiments.

FIG. 3 illustrates a method 100 of generating user personalized search results, in accordance with some embodiments. FIG. 4 illustrates a system architecture 150 for executing the method 100 of FIG. 3, in accordance with some embodiments. At step 102, a user query is received from a client system 22a at a system, such as, for example, the search system 28. The user query may include a converted speech query provide by a user via the user system 22a, the front-end system 24, and/or the speech recognition system 26. In some embodiments, the user query is related to one or more products contained in an inventory, such as an e-commerce inventory. For example, in some embodiments, a user may request a search for "apples," "red apples," "granny smith apples," etc.

At step 104, non-personalized relevance-based search results are generated, for example, by performing a relevance-based search of an associated inventory based on the user query. In the embodiment illustrated in FIG. 4, the search system 28 is configured to implement a personalization application programming interface (API) 152. The personalization API 152 is configured to receive the search query from the user system 22a and provide the query to a search API 154. The search API 154 may be provided by the search system 28 and/or any other suitable system. The search API 154 receives the user query and generates non-personalized relevance-based results using one or more predetermined search algorithms. The search API 154 may implement any suitable search algorithm, process, program, etc. For example, in some embodiments, the search API may include a Preso API, SQL API, and/or any other suitable search API. To continue the example from above, a user query may include a search for "red apples" which returns items from an inventory database 32 matching the string "red apples."

At step 105, user historical data is received. User historical data may include, but is not limited to, data regarding the products that have been previously identified in user search results, items previously viewed by a user (e.g., click-through), items previously added to a user's cart, items previously purchased by a user, etc. At step 106, one or more item attributes are generated for items included in the non-personalized relevance-based search results and/or associated with the user generating the search query. In some embodiments, item attributes may be extracted (i.e., generated) by an attribute extraction system 40 and stored in an attribute database 34 prior to the receipt and execution of a search query from a user system 22a. In other embodiments, the attribute extraction system 40 and/or the search system 28 may be configured to extract item attributes in real-time when a search query is received from the user system 22a. Although embodiments are illustrated including step 106 as a discrete step, it will be appreciated step 106 may be incorporated into one or more of steps 108-114 discussed in greater detail below.

Figure 5:
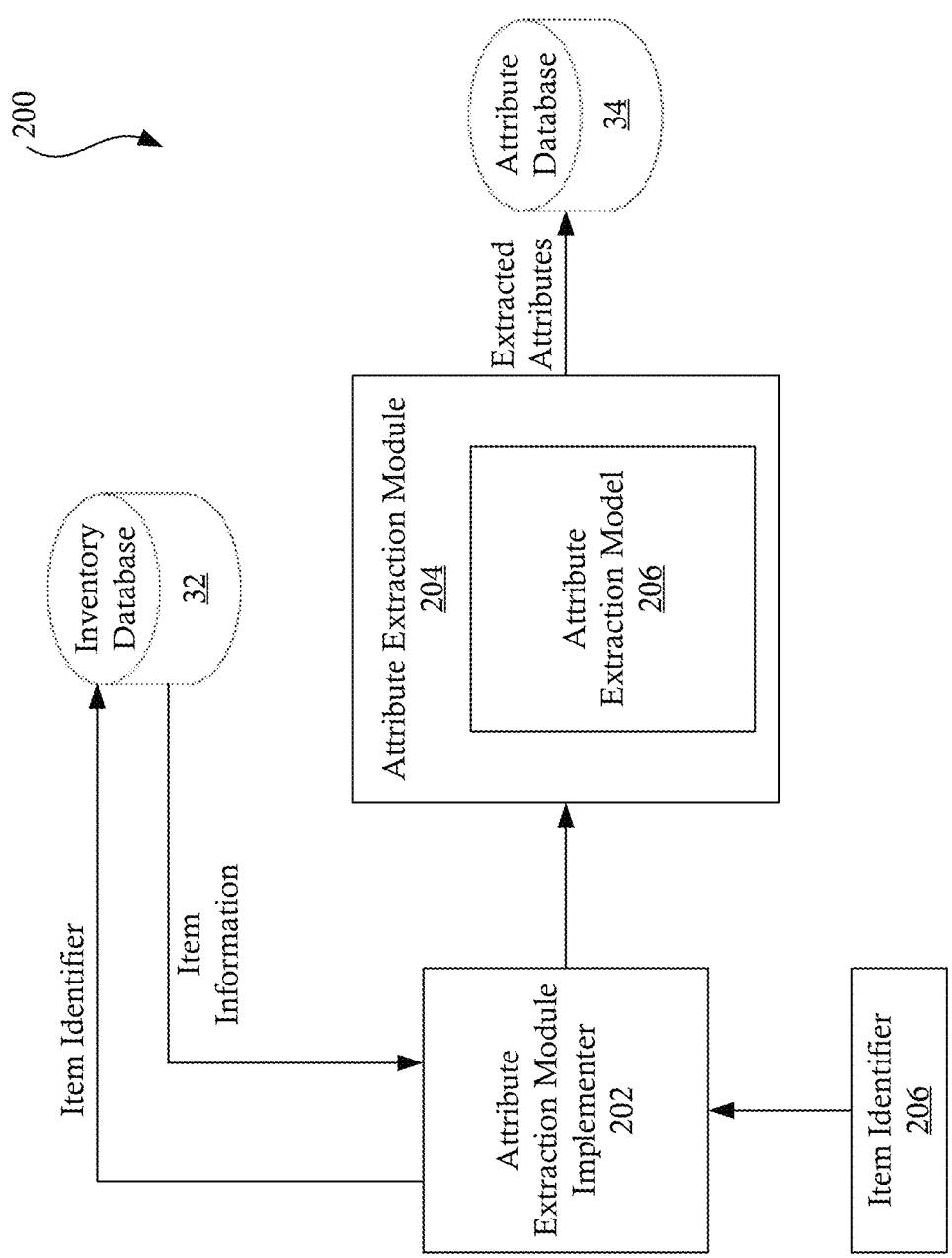
FIG. 5 illustrates one embodiment of a process of attribute extraction, in accordance with some embodiments.

FIG. 5 illustrates one embodiment of a process 200 of attribute extraction, in accordance with some embodiments. An attribute extraction module implementer 202 receives an item identifier 206, for example, an identifier of an item associated with the user generating the user query. The item identifier can include any suitable item identifier, such as, for example, an inventory control number, stock keeping unit (SKU), item name, etc. The item identifier is uniquely associated with one item in an inventory, such as an e-commerce inventory.

The attribute extraction module implementer 202 receives the item identifier 206 and retrieves item information from an inventory database 32. The inventory database may include any suitable information related to items in the inventory, such as, for example, textual descriptions associated with the item (e.g., name, description, etc.), indexed information (e.g., brand, quantity, type, etc.), and/or any other suitable information associated with an item in the inventory database 32. After retrieving item information, the attribute extraction module implementer 202 implements (e.g., instantiates) an attribute extraction module 204.

In some embodiments, the attribute extraction module 204 includes a trained attribute extraction model 206 configured to parse the received item information into discrete attributes associated with the item. For example, in various embodiments, attributes associated with an item may include, but are not limited to, product, type, product type, global product type, flavor, brand, weight, count, food form, allergens, allergens not contained, dietary need, dietary method, nutrient, restriction, restricted food, container type, unit, size, modifiers, flavor, etc. The attribute extraction model 206 is configured to receive the raw item information and extract each relevant attribute associated with the item.

Figure 6:
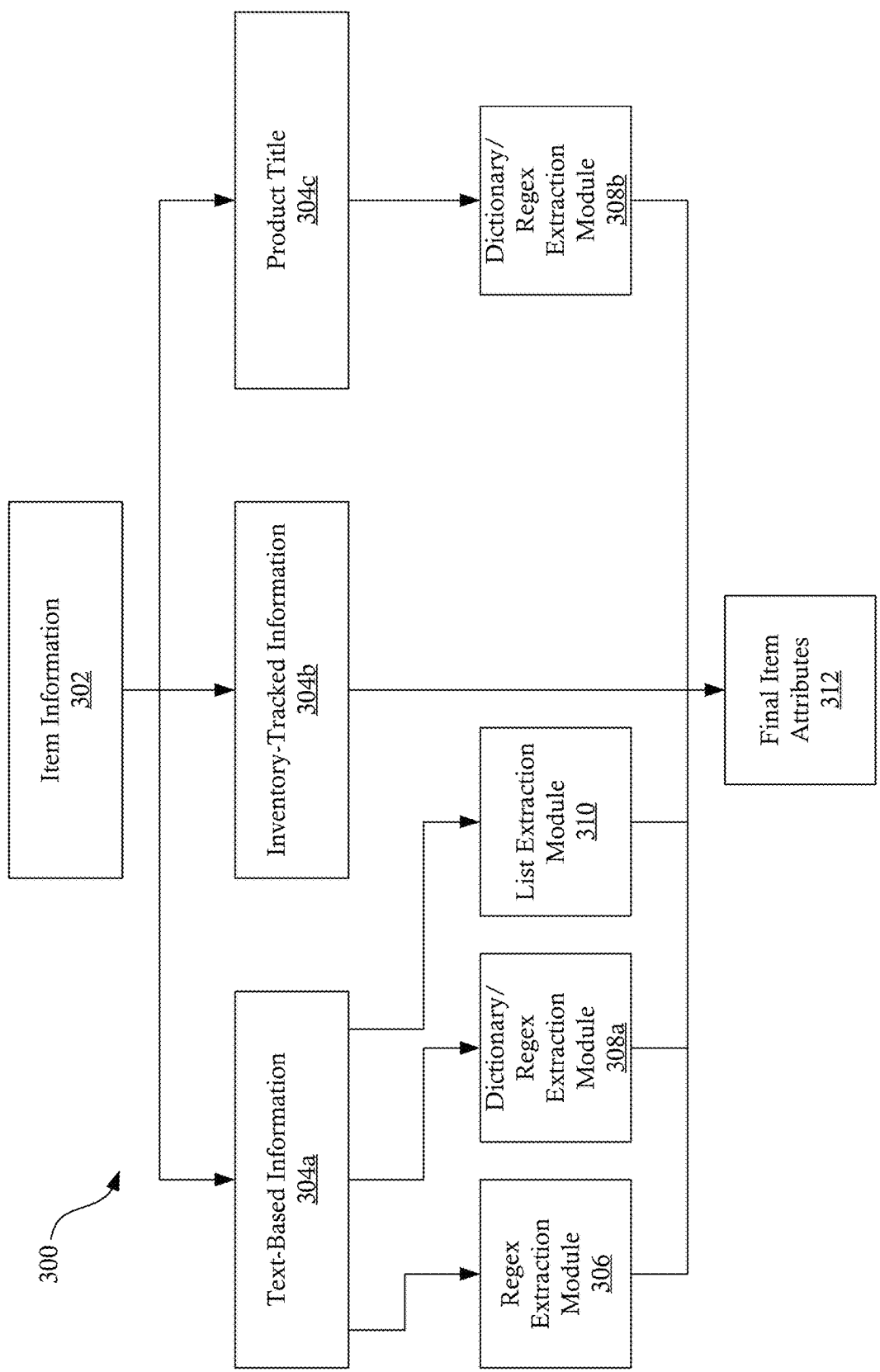
FIG. 6 illustrates an item attribute extraction process configured to be implemented by a trained attribute extraction model, in accordance with some embodiments.

For example, FIG. 6 illustrates an item attribute extraction process 300 configured to be implemented by a trained attribute extraction model 206, in accordance with some embodiments. Item information 302 is received, for example, by the attribute extraction module 204 illustrated in FIG. 5. The item information is parsed by the information type. For example, in the illustrated embodiment, text-based information 304a, inventory-tracked information 304b, and product title information 304c are each parsed from the received item information. Text-based information 304a may include any suitable text-based description and/or information, such as, for example, written titles, descriptions, or attributes including, but not limited to, size, count, quantity, nutrient, restriction, restricted foods, unit, product modifiers, etc. Inventory-tracked information 304b may include information tracked by an inventory system, such as, for example, brand, product type, etc. In some embodiments, the inventory-tracked information includes a plurality of tracked attributes. Some information, such as title information 304c, may be identified separately from other similar information (e.g., text-based information 304a).

In some embodiments, the text-based information 304a is provided to one or more text-extraction modules 306-310 configured to extract text-based attributes of the item. For example, in the illustrated embodiment, a regular expression (regex) extraction module 306 is configured to extract attributes using regular expressions. For example, in some embodiments, the regex extraction module 306 may be configured to extract item attributes such as item size, item count, item quantity, etc., although it will be appreciated that the regex extraction module 306 can be configured to extract any suitable information. As another example, in the illustrated embodiment, a dictionary extraction module 308a is configured to use a combination of dictionary look-ups and regex searches to extract item attributes such as nutrients, restrictions, restricted foods, units, allergens, etc. Similarly, a dictionary extraction module 308b may be configured to extract attributes, such as product, type, etc. from specific inputs, such as, for example, a title. As yet another example, in the illustrated embodiment, a list extraction module 310 is configured to extract predetermined attributes from the text-based information such as the modifiers from the top adjectives contained within the text-based information. The extracted attributes are combined into a final item attribute set 312.

As one example, a first item associated with a user may be a "Brand A Gala Red Apple," which is sold as individual units (e.g., 1 count). Item information for the Brand A Gala Red Apple may include a textual description of the product, such as, for example, "Fresh Brand A Gala Red Apple." An inventory system may track the count (e.g., count 1) of each "Brand A Gala Red Apple" within an inventory. An item identifier associated with the Brand A Gala Red Apple is received at the attribute extraction module implementer 202, which loads the item description from the inventory database 32. The loaded item description is provided to an instantiated attribute extraction module 204 including a trained attribute extraction model 206. The attribute extraction module may extract the following attributes from the item information: Brand: Brand A; Count: 1; Product: Apple; Type: Gala, Red, Fresh; Product Type: Fresh and Frozen Fruit. Although specific embodiments are discussed herein, it will be appreciated that alternative and/or additional attributes may be extracted by the attribute extraction model 206.

As another example, in some embodiments, an e-commerce inventory may include, as a product, "Freshness Guaranteed Boneless Chicken Breasts, 4.6-5.75 lbs." An item identifier, such as SKU or other inventory number associated with this product, is provided to the attribute extraction module implement 202, which loads the item description for the item database 32 and instantiates an instance of an attribute extraction module 204 including a trained attribute extraction module 206. The attribute extraction module 206 processes the data provided for the chicken breasts and extracts attributes including: Product: Chicken; Type: Breasts, Boneless; Product Type: Chicken; Global Product Type: Chicken Breasts; Brand: Freshness Guaranteed; Quantity: 92 oz.; Nutrient: Protein, Sodium, Trans Fat, Calories; Modifiers: Outer, Frozen, Nutritious, Boneless; Size: Large; Unit: Pack, lb.; Restricted Food: Meat; Restriction: Low Fat; Dietary Need: Low Fat. Although specific embodiments are discussed herein, it will be appreciated that any suitable item attributes can be extracted from any item in accordance with the present disclosure.

Figure 7:
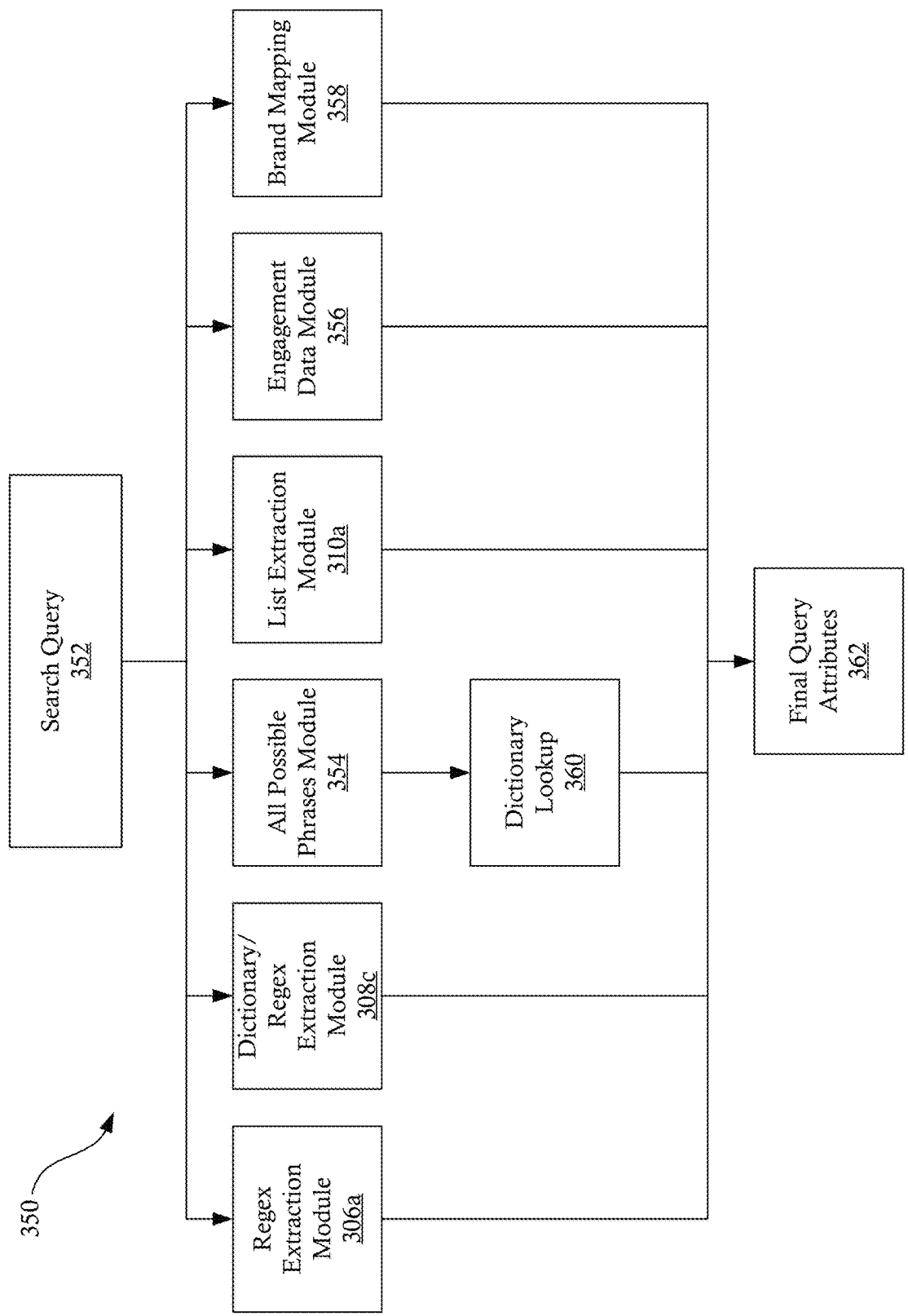
FIG. 7 illustrates a query attribute extraction process, in accordance with some embodiments.

With reference again to FIGS. 3 & 4, at step 108, in some embodiments, one or more query attributes are extracted from the search query received from the user system 22a. The query attributes include attributes specified in and/or related to the search query received from the user system 22a. Extraction of query attributes from a search query is similar to extraction of item attributes for an identified item. FIG. 7 illustrates a query attribute extraction process 350, in accordance with some embodiments. The query attribute extraction process 350 may be implemented by any suitable system and/or module, such as, for example, an attribute extraction module 204 implemented by an attribute extraction system 40 and/or a search system 24. A search query 352 is received by the attribute extraction module 204, which parses the search query 352 using a plurality of extraction modules 306a, 308c, 310a, 354, 356, 358.

For example, in the illustrated embodiment, a regex extraction module 306a is configured to extract one or more attributes using regular expressions, such as size, count, quantity, etc. contained within the search query 352. As another example, a dictionary extraction module 308c is configured to extract one or more attributes using a dictionary look-up and regular expressions, such as nutrients, restrictions, restricted foods, units, allergens, etc. In some embodiments, an all possible phrases module 354 is configured to iterate through each combination of the words contained within the search query 352 to generate "all possible phrases" from the search query 354. Each generated phrase is provided to a dictionary look-up module 360 configured to generate product, type, and/or other attributes based on a dictionary look-up of each generated phrase. A list extraction module 310a may be configured to extract predetermined attributes from the search query 352, an engagement data module 356 may be configured to extract product types, global product types, etc. by performing an item search within a predefined table, and/or a brand mapping module 358 may be configured to map the product type of the search onto various brands associated with the product type. The extracted attributes are combined into a final query attribute set 362.

As one example, in some embodiments, a search query 352 received from a user system 22a may include the string "cranberry sauce." The search query is processed to extract attributes from the search string. For example, the query attributes extracted from the search string "cranberry sauce" may include: Product: Sauce; Type: Cranberry; Product Type: Fruit Sauces; Global Product Type: Cranberry Sauces; Flavor: Cranberry; Food Form: Liquids; Allergens: Cranberry.

Figure 8:
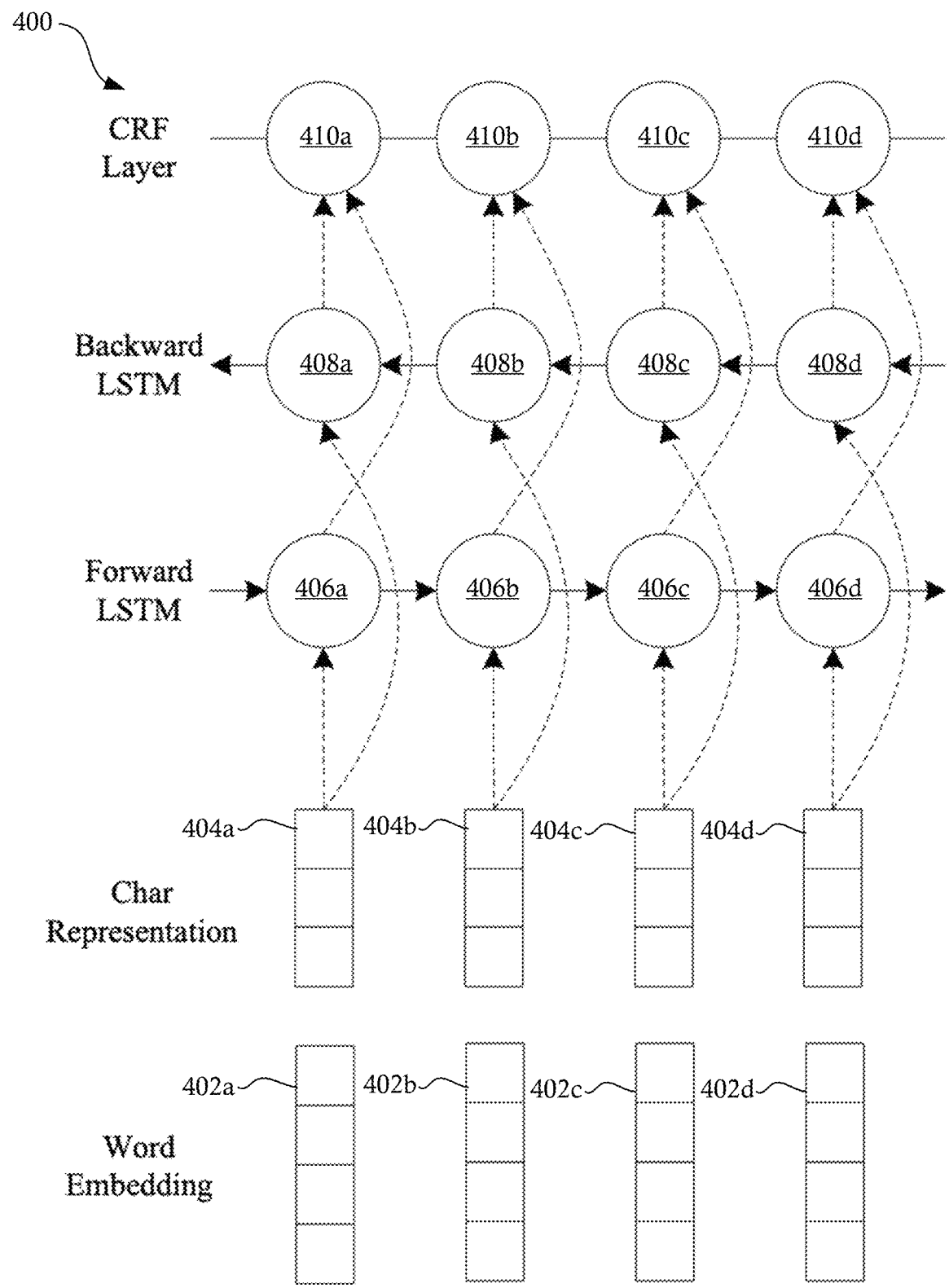
FIG. 8 illustrates a convolution neural network (CNN) configured to extract attributes from textual item descriptions, in accordance with some embodiments.

In some embodiments, one or more attributes may extracted using a machine learning attribute extraction module, such as, for example, an attribute extraction module including a trained neural network. For example, FIG. 8 illustrates a neural network 400 configured to extract attributes from textual item descriptions. A string of words representative or descriptive of a selected item is received. For example, in one embodiment, the received string of words indicates that an item is "cream of mushroom soup." Each of the individual words are converted into a word embedding 402a-402d. As used herein, the term embedding refers to a real-value vector representation of the received descriptor. For example, in the illustrated embodiment, each of the words are converted from text to a real-value vector representation, represented as word embeddings 402a-402d in FIG. 7.

Figure 9:
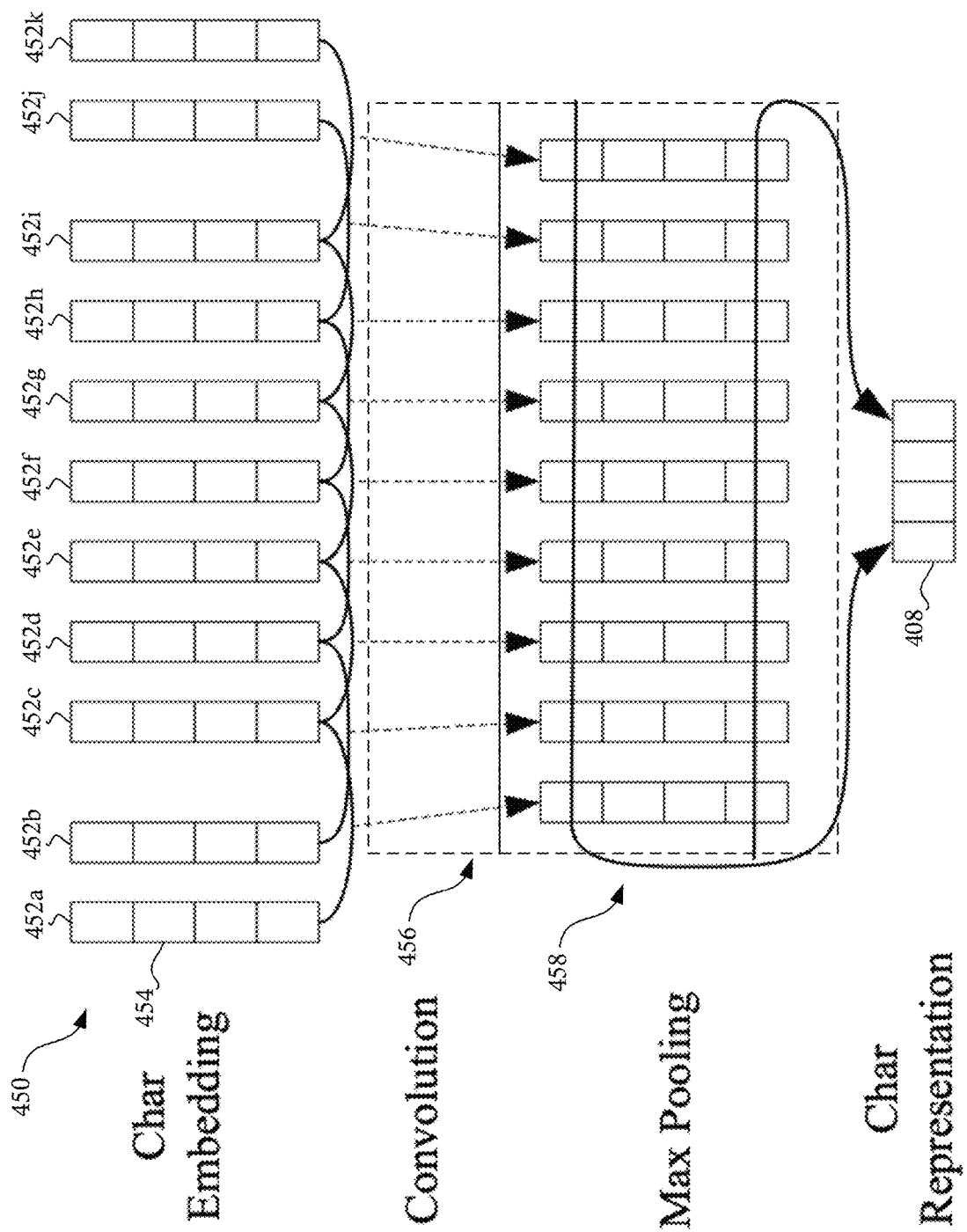
FIG. 9 illustrates a process flow for generating a character representations, in accordance with some embodiments.

In some embodiments, the word embeddings 402a-402d are combined with character representations 408a-408d for each character in the word 404a-404d. The character representations 408a-4048d may be generated according to any suitable process, such as, for example, as illustrated in FIG. 9. As illustrated in FIG. 9, a convolution neural network 450 is configured to receive a plurality of character embeddings 452a-452k representative of the characters included in a word 404e. In some embodiments, embeddings 452h-452k representative of padding characters 454 may be included before and/or after the characters of a word 404e. Each of the character embeddings 452 is provided to a trained convolution layer 456. The output of the convolution layer 456 is provided to a max pooling layer 458, which is configured to down-sample the output of the convolution layer 456 to generate a character representation 408 of the received word.

With reference again to FIG. 8, the word embeddings 406a-406d may be combined with the character representations 408a-408d to generate representations for each word 404a-404d in the received text. For example, in some embodiments, the word embeddings 406a-406d and the character representations 408a-408d are concatenated, although it will be appreciated that any suitable combination may be used. Although the word embeddings 406a-406d and the character representations 408a-408d are illustrated as being of similar size for each word, it will be appreciated that the word embeddings 406a-406d and/or the character representations 408a-408d can have any suitable length and/or size.

Figure 10:
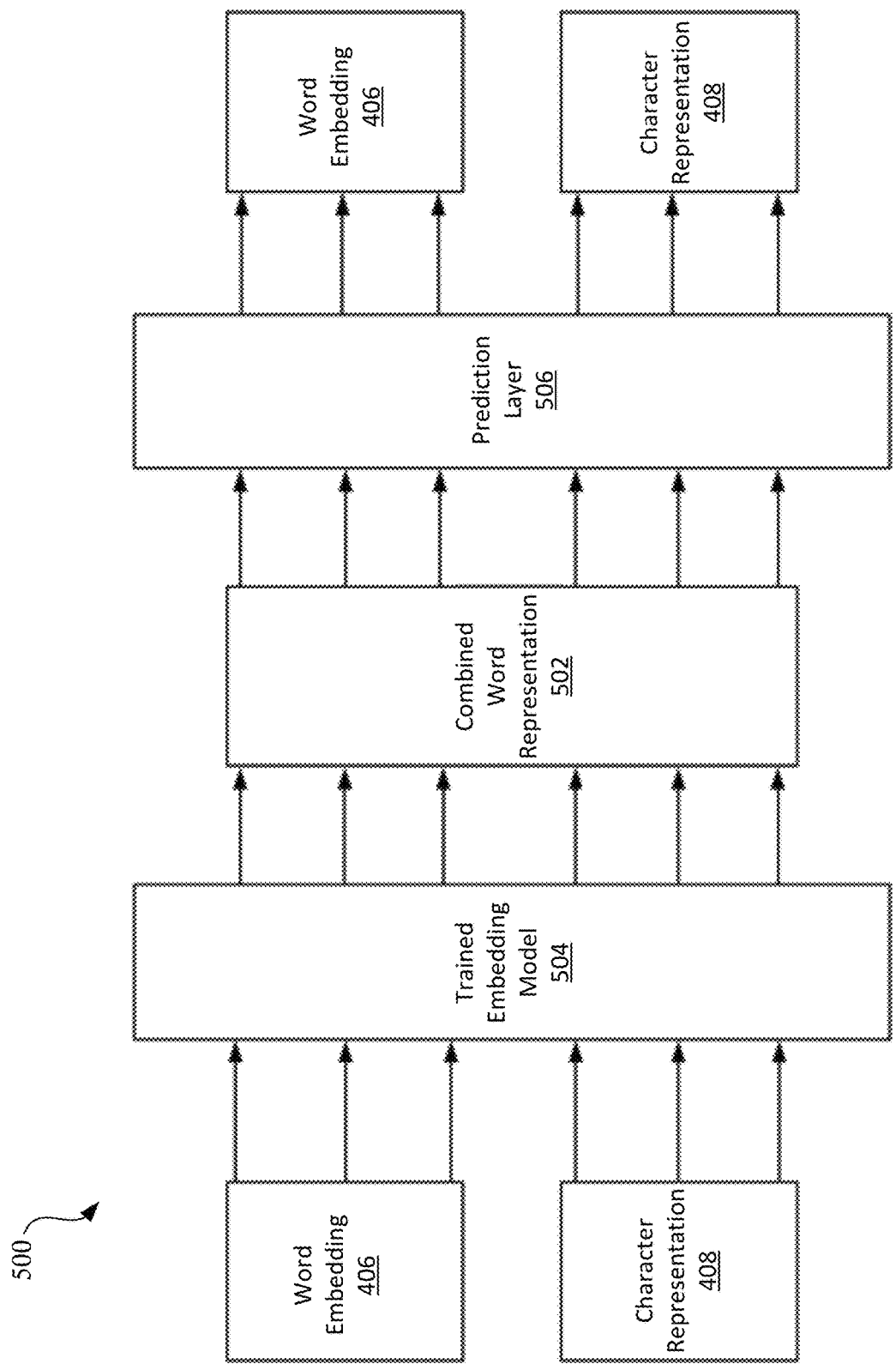
FIG. 10 illustrates a process flow for generating a combined word representation, in accordance with some embodiments.

FIG. 10 illustrates a process flow 500 for generating a combined word representation 502, in accordance with some embodiments. In the illustrated embodiment, a word embedding 406 and a character representation 408 are received by a trained embedding model 504 configured to generate a combined word representation 502. The embedding model 504 may include a bi-directional symmetrical deep neural network configured to encode the received word embedding 406 and character representation 408 into a single condensed embedding, i.e., a word representation 502. The word representation 502 includes a reduced representation of the word embedding 406 and the character representation 408 such that the word representation 502 may be used to predict the word embedding 406, the character representation 408, and/or elements thereof. In some embodiments, a prediction layer 506 is configured to receive the word representation 502 and generate word embeddings 406 and/or character representations 408 to verify the word representation 502. For example, such verification may occur during training of the model 504.

With reference again to FIG. 8, the generated word representations 502 (as shown in FIG. 10) may be provided to a preconfigured model (or neural network), such as, for example, a bi-directional long short-term memory (LSTM) layer (Bi-LSTM layer) 410. The Bi-LSTM layer 410 includes a forward LSTM layer 412 and a backward LSTM layer 414. The forward LSTM layer 412 and the backward LSTM layer 414 provide contextual information regarding previous input (backward LSTM layer 414) and future input (forward LSTM layer 412). Although embodiments are discussed herein including a Bi-LSTM layer 410, it will be appreciated that any suitable bidirectional neural network, such as any suitable bidirectional recurrent neural network, may be used.

In the illustrated embodiment, the output of the Bi-LSTM network 410 is provided to a conditional random field (CRF) layer 416. The CRF layer 416 is configured to generate final attribute values for the input received. The CRF layer 416 applies a structured prediction model to predict attributes for the received input. The structured prediction model is configured to consider context when generating the attributes. The CRF layer 416 is configured to encode the known relationships between observations (e.g., word combinations) and construct consistent representations (e.g., attributes) for those observations.

For example, in some embodiments, for an input sentence, X, where $X=(x_1, x_2, \ldots, x_n)$, an output matrix from the Bi-LSTM layer 410 (P) has dimensions n×k, where k is the number of distinct tags generated for the input and $P_{i,j}$ corresponds to a score of the jth tag for the ith word in the input. The CRF layer 416 generates a sequence of label predictions, y, where $y=(y_1, y_2, \ldots, y_n)$. The score for each label predictions is defined as:

$$s(X, y) = \sum_{i=0}^{n} A_{y_i, y_{i+1}} + \sum_{i=1}^{n} P_{i, y_i}$$

where A is the matrix of transition scores such that $A_{i,j}$ represents the probability of transition from tag i to tag j. In some embodiments, a softmax is applied to all possible tag sequences to yield a probability for sequence Y, where:

$$p(y \mid X) = \frac{e^{s(X,y)}}{\sum_{\tilde{y} \in Y_X} e^{s(X,\tilde{y})}}$$

In some embodiments, the log-probability of the correct tag sequence is maximized, for example, during training of the neural network 400. The log-probability may be maximized such that:

$$\log(p(y \mid X)) = s(X, y) - \log\left(\sum_{\tilde{y}} e^{s(X,y)}\right) = s(X, y) - \operatorname*{logadd}_{\tilde{y} \in Y_X} s(X, \tilde{y})$$

where $Y_X$ represents all possible tag sequences for X. In some embodiments, the output sequence that obtains the maximum score is given by:

$$y^* = \operatorname*{argmax}_{\tilde{y} \in Y_X} s(X, \tilde{y})$$

In some embodiments, the CRF model can include a sequence CRF model in which training and decoding can be solved efficiently by adopting the Viterbi algorithm.

In some embodiments, the query attributes for the N most frequent searches are extracted and stored in a database prior to receiving the search query from the user system 22a. For example, the query attributes for the one million most frequent searches, one-hundred thousand most frequent searches, etc. may be extracted, aggregated, and stored in a database, such as a query attribute database 36. Pre-extraction of the query attributes for the most frequent queries reduces processing time and load for real-time processing of search queries. In some embodiments, query attributes may be extracted in real-time (or near real-time) when a search query is received from the user system 22a.

In some embodiments, additional and/or alternative item or query attributes may be generated according to one or more additional processes. For example, in some embodiments, an engagement query attribute is generated for one or more items returned in the relevance-based search. The engagement query attribute provides a score indicative of the engagement (or interactions) for items based on a particular search query. User engagement data may be aggregated to generate a general user engagement score. User engagement data may include, but is not limited to, the number of times an item was returned for a given query, the number of times an item was reviewed in a result set, the number of times an item was selected (e.g., "clicked") in a result set, the number of times a selected item was added to a user's cart, the number of times an item was ordered, and/or the quantity of item ordered for each query. One or more query-item attributes may be calculated from the aggregated engagement data. For example, in some embodiments, a click-through rate (number of times an item is clicked/the number of times an item is returned in search results) may be calculated. Engagement data may be maintained over any suitable time period, such as, for example, the last N months, the last N weeks, the last N days, the last N hours, etc.

In some embodiments, a text similarity query-item attribute is generated based on the similarity between the terms used in the search query (e.g., "query_words") and terms used to describe and/or list items in the item database (e.g., "item_words"). A normalized set of terms in the query may be compared to a normalized set of terms in an item title to determine the similarity between the search and the item. In some embodiments, Jaccard Similarity is applied, where:

$$jaccard\_sim = |query\_words \: \& \: item\_words| / |query\_words \cup item\_words|$$

In other embodiments, a modified Jaccard Similarity is applied, wherein:

$$mod\_jaccard\_sim = |query\_words \: \& \: item\_words| / |query\_words|$$

Items may be ranked using text similarity (e.g., Jaccard Similarity, modified Jaccard Similarity, etc.) between text-based attributes of the items (e.g., title, description) and the search query.

At step 110, user-specific search results are generated and provided to the user system 22a. In some embodiments, the user-specific search results are generated based on the query attributes, item attributes, and/or other suitable data. For example, in various embodiments, one or more query attributes and one or more item attributes for user-associated items are provided to a real-time ranking model 154 configured to re-rank the relevance-based search results based on correlation between the query attributes and the user-associated items. For example, if the relevance-based search results returned multiple brands of a products and the user has previously purchased a first brand of that product, the real-time ranking model 154 may be configured to rank the first brand higher in a set of user-personalized search results as compared to where the first brand appears in the relevance-based search results. In some embodiments, the real-time ranking model 154 may be configured to apply supervised and/or unsupervised processes to generate user-specific search results.

Figure 11:
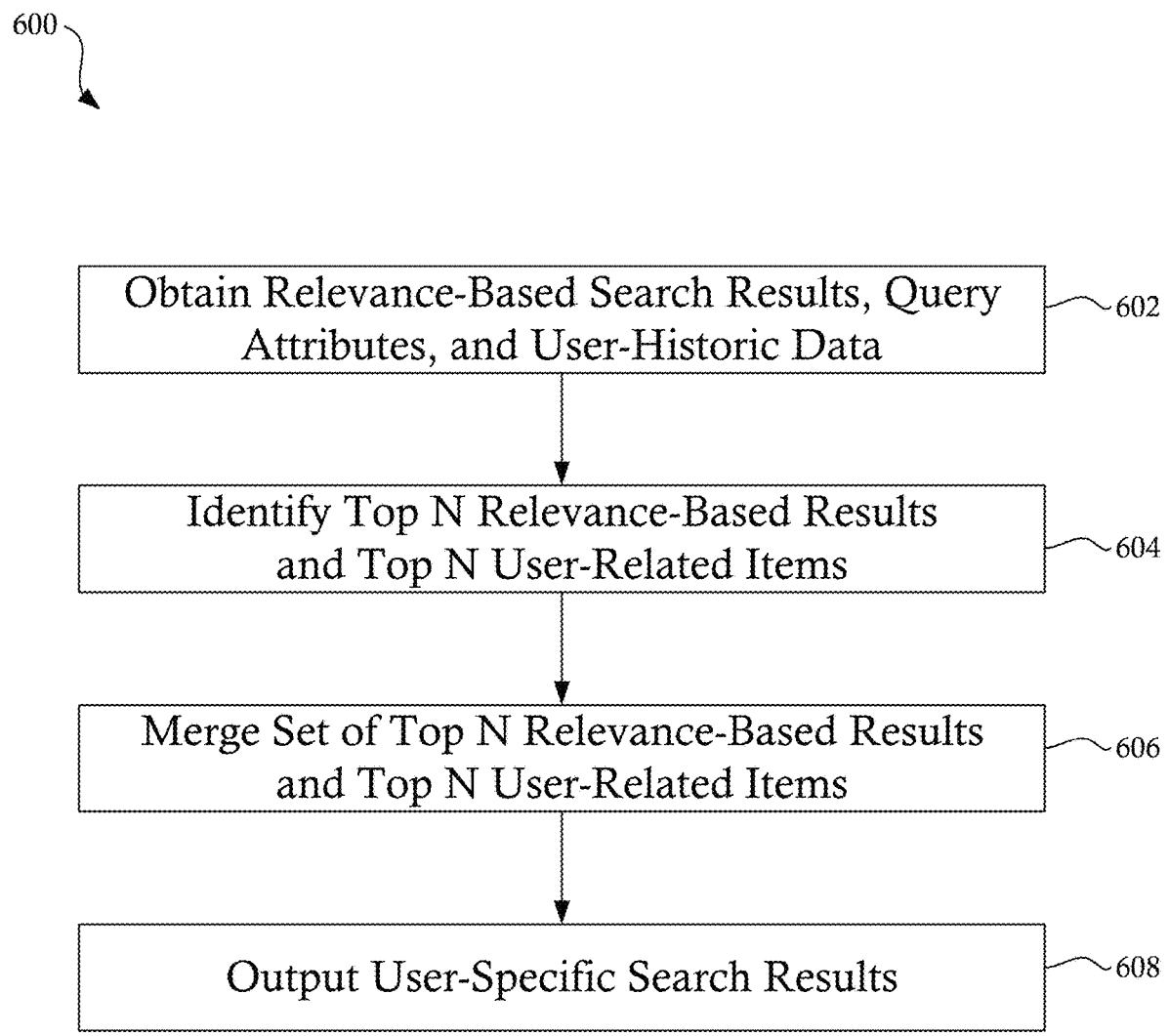
FIG. 11 illustrates a method of unsupervised generation of user-specific search results, in accordance with some embodiments.

FIG. 11 illustrates a method 600 of unsupervised generation of user-specific search results, in accordance with some embodiments. At step 602, relevance-based search results, query attributes, and user historic data are received, for example, by the real-time ranking module 154. Although specific embodiments are discussed herein, it will be appreciated that the real-time ranking module 154 can be configured to generate and/or obtain any suitable data.

At step 604, a set of the top N search results from the relevance-based search results and a set of the top N user-specific results are obtained. The top N user-specific results may be obtained by comparing the relevance-based search results to a user representation embedding (discussed in greater detail below), applying filtering to the user historic data to identify query-relevant user-specific items, and/or otherwise identifying user-preferred items in the relevance-based search results. In some embodiments, a list of X previously purchased items (such as the last 100 purchased items) for the user is obtained by the real-time ranking module 154. The real-time ranking module 154 is configured to apply one or more filters to the list of X previously purchased items to identify query-relevant items (and/or to exclude query-irrelevant items). For example, in some embodiments, the real-time ranking module 154 is configured to apply one or more thresholds, such as an added-to-cart threshold (equal to the number of times an item is added to a cart divided by the number of times an item is viewed), an impression rate (equal to the number of total impressions/views divided by the total number of times an item is identified in a search), etc. After filtering, the top N results in the filtered list of X previously purchased items may be selected.

At step 606, the set of top N relevance-based search results and the set of top N user-specific results are merged into a single mixed set of search results. For example, in some embodiments, attribute weightings are determined and/or received for one or more attributes shared by the set of top N relevance-based search results and the set of top N user-specific results. The set of top N relevance-based search results and the set of top N user-specific results may be merged using, for example, a pairwise comparison of attributes based on the attribute weightings.

Figure 12:
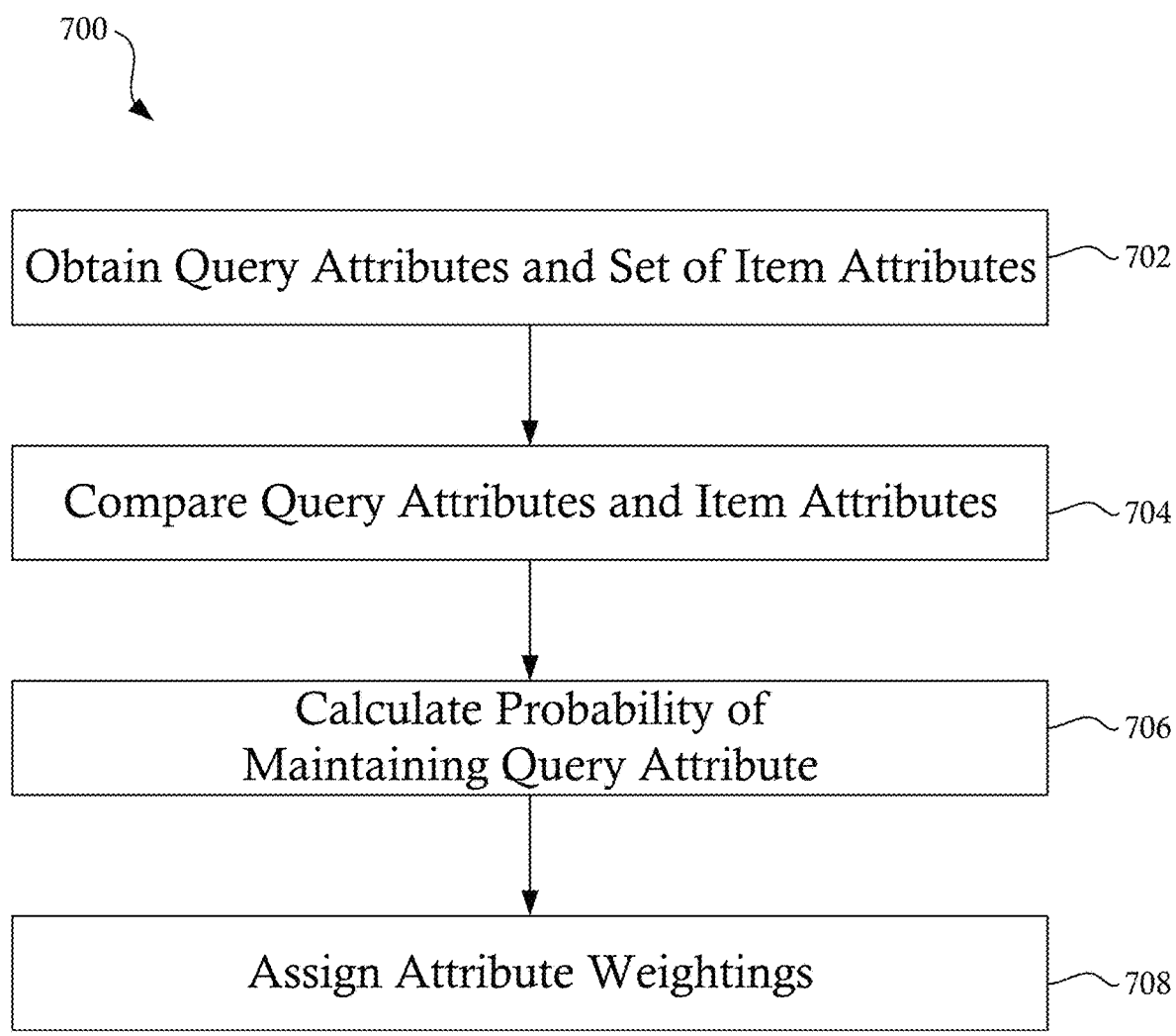
FIG. 12 illustrates one embodiment of a method of generating and assigning query attribute weights, in accordance with some embodiments.

FIG. 12 illustrates one embodiment of a method 700 of generating and assigning attribute weights, in accordance with some embodiments. At step 702, the query attributes for a specific query and a set of item attributes for the top N items associated with a search query are obtained. The top N items may be identified by engagement data, such as, for example, the number of times that an item was returned for a search query, selected (e.g., clicked-on/click-through) by a user, added to a user's cart, purchased by a user, etc. For example, in one embodiment, the top N items include the top five items added to a cart after a specific search query is received as determined by aggregated past engagement data. Although specific embodiments are discussed herein, it will be appreciated that the top N items can include any suitable number of items.

At step 704, the query attributes are compared to the item attributes for the top N items to determine the number of matches between the query attributes and the item attributes. For example, in some embodiments, a count is generated for each query attribute identified for the search query. The count represents the number of times a given query attribute appears as or otherwise matches an item attribute. At step 706, the probability of a user maintaining the attribute, e.g., the probability of a query attribute having the same (or matching) value as an attribute of an item added to the user's cart, is determined. In some embodiments, the calculated probability for each query attribute corresponds to a weighting of that query attribute for the search query. At step 708, attribute weightings are assigned based on the calculated probabilities. As one example, if a search query includes the a "gluten-free" restricted food attribute, the user is likely looking only for gluten-free versions of a product and the restrict food query attribute will have a high probability of being retained in the items selected, which results in a heavy weighting of the restricted food query attribute.

With reference again to FIG. 11, at step 608, the merged list is output as a user-specific search result set. The user-specific search result set may be provided to a user system, such as, for example, the user system 22a that generated the original search query. The user specific search result set may be provided to the user system 22a in any suitable form, such as, for example, text configured for use in a text-to-speech element implemented by the user system 22a. Although specific embodiments are discussed herein, it will be appreciated that the user specific search result set may be provided to the user system 22a in any suitable format and conveyed to the user using any suitable output of the user system 22a.

Figure 13:
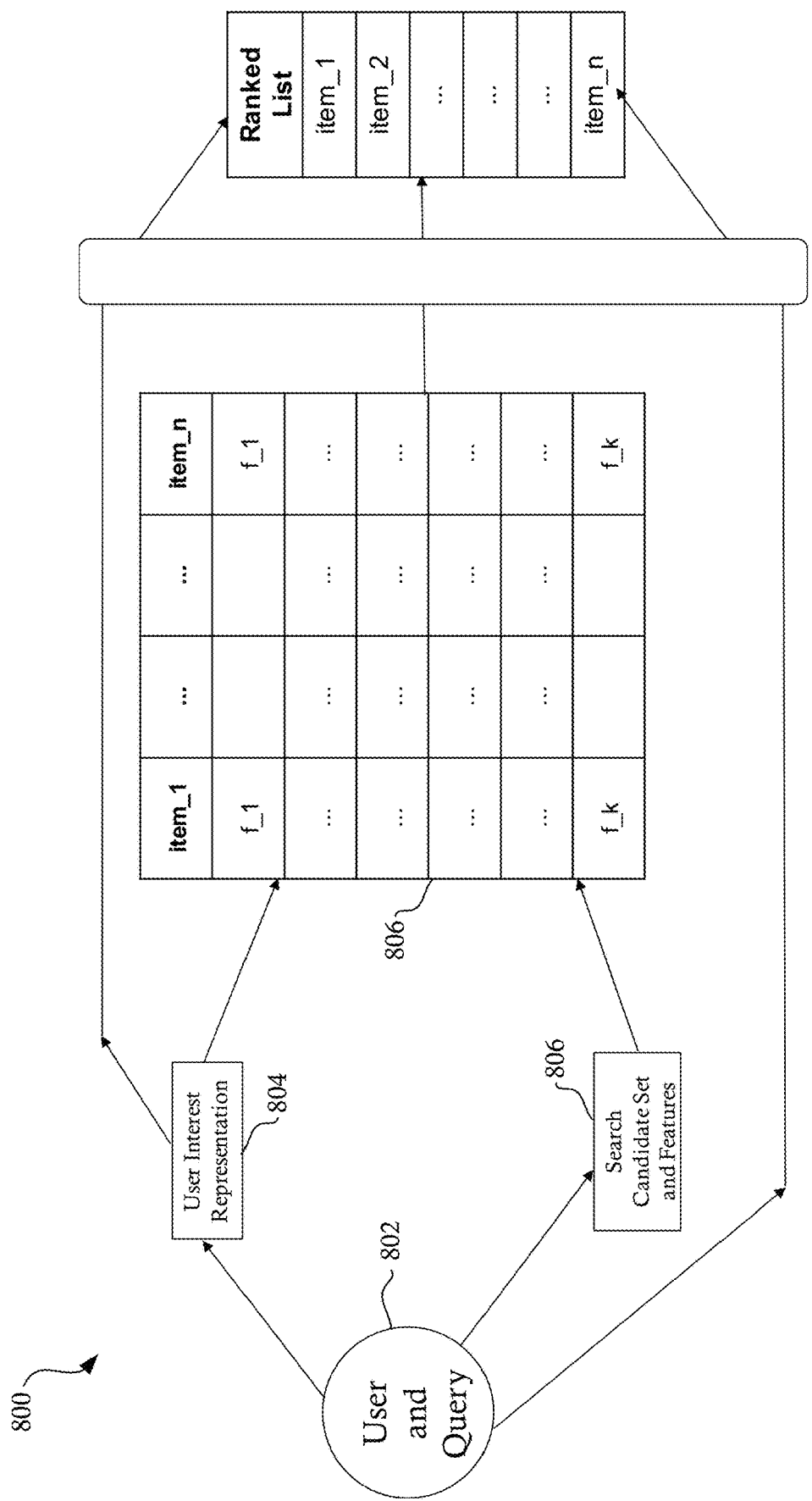
FIG. 13 illustrates a supervised re-ranking process configured to rank items based on a user interest embedding and a query embedding, in accordance with some embodiments.

FIG. 13 illustrates a supervised re-ranking process 800 configured to rank items based on a user interest embedding and a query embedding, in accordance with some embodiments. In some embodiments, a search query and user identifier 802 are received from a user system, such as the user system 22a. A user interest representation 804, a set of items (e.g., search candidates) and query attributes (e.g., features) 806 are generated based on the received search query 802. The user interest representation 804 and a set of query attributes 806 may be generated for the user and/or the search query using any suitable method. For example, in some embodiments, a user interest representation 804 is generated according to the process illustrated in FIG. 14 (discussed below), a set of search candidates are generated by the search API 156, and query attributes may be generated according to the process illustrated in FIG. 8 (discussed above).

Figure 14:
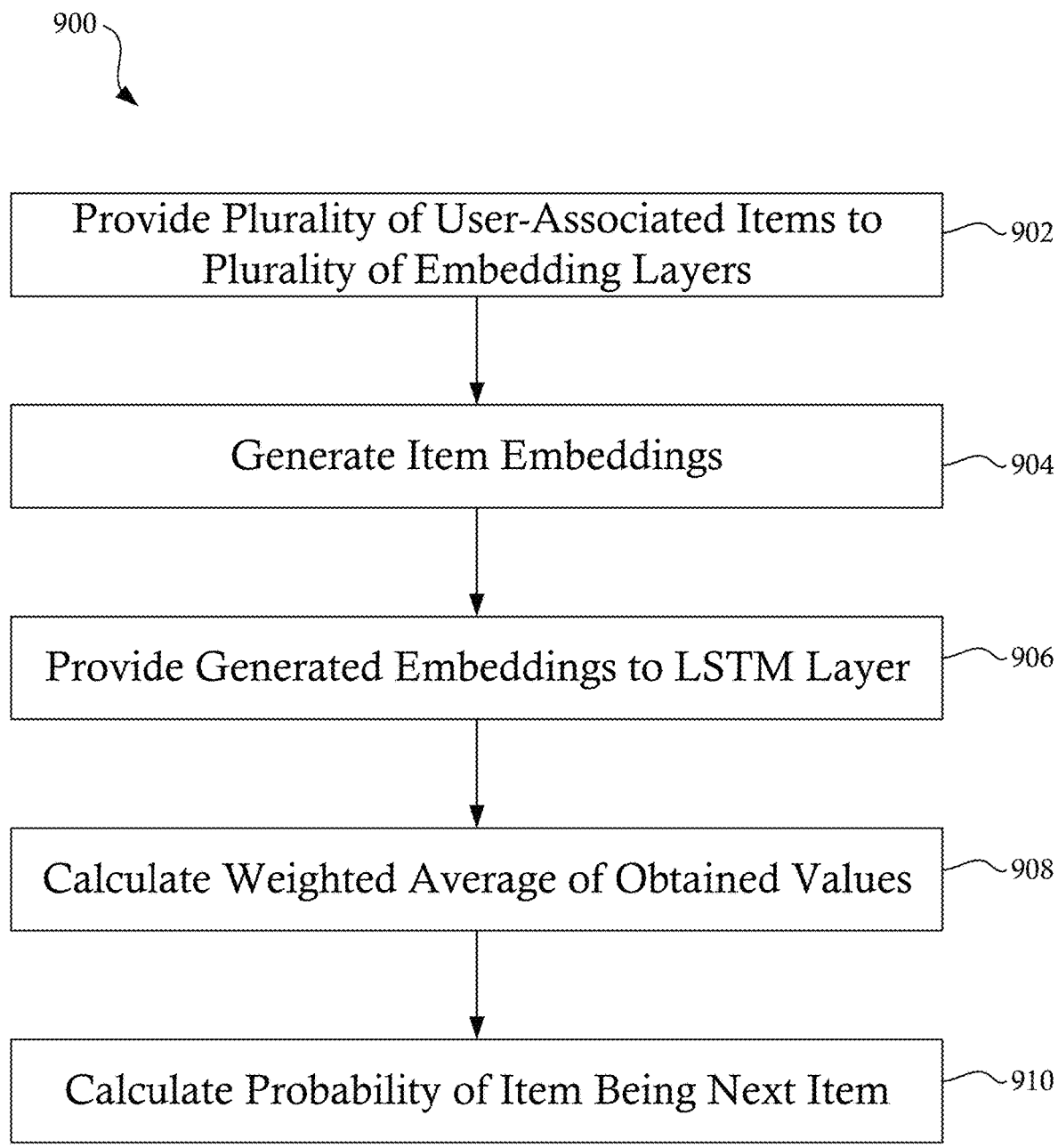
FIG. 14 illustrates a method of generating a user interest embedding, in accordance with some embodiments.
Figure 15:
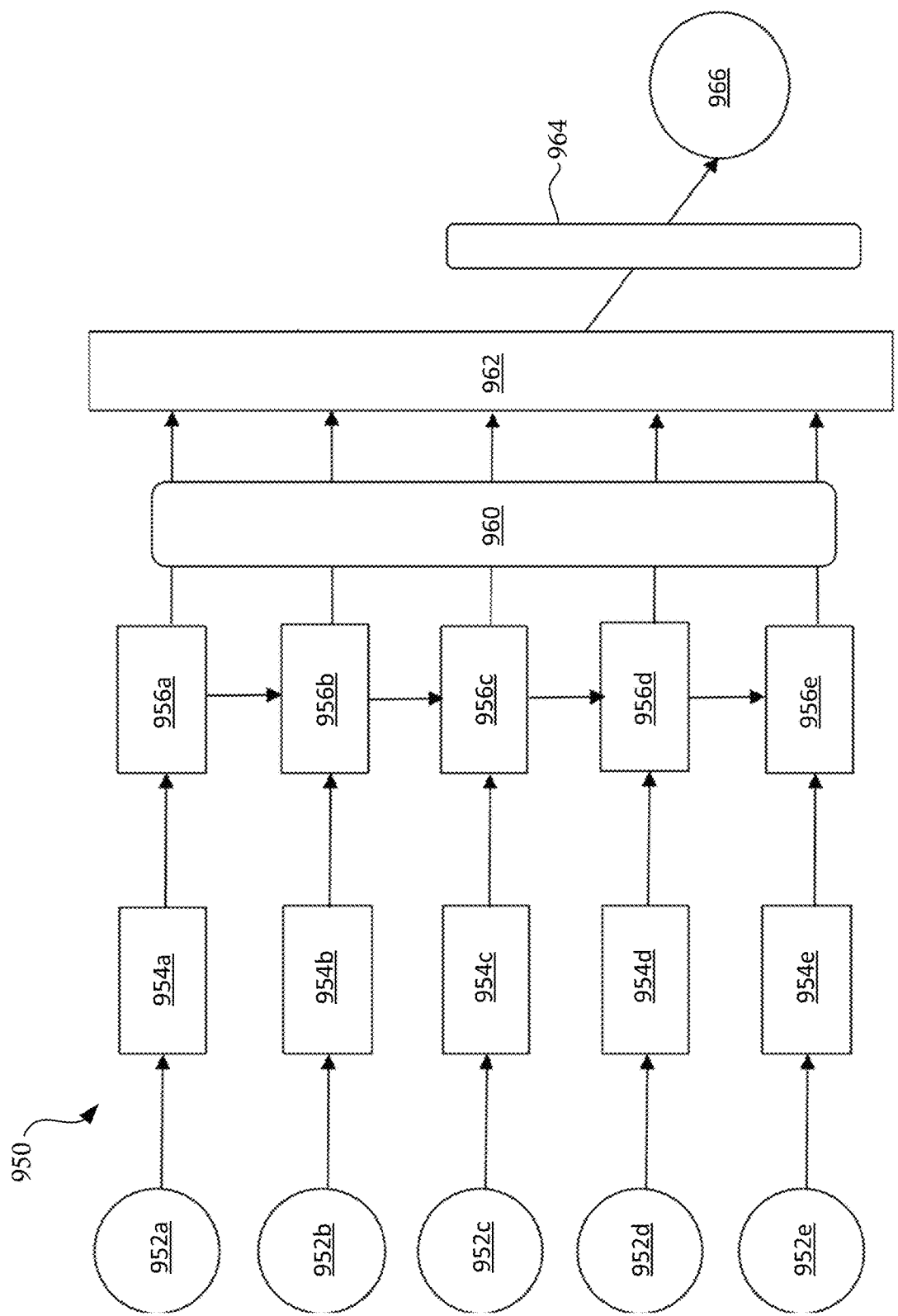
FIG. 15 illustrates a process flow of the method of generating an interest embedding illustrated in FIG. 14, in accordance with some embodiments.

In some embodiments, the user interest representation 804 includes a user interest embedding. FIG. 14 illustrates a method 900 of generating a user interest embedding, in accordance with some embodiments. FIG. 15 illustrates a process flow 950 of the method 900 of generating an interest embedding illustrated in FIG. 14, in accordance with some embodiments. At step 902, a plurality of user-associated items 952a-952e are provided to a plurality of embedding layers 954a-954e. The user-associated items 952a-952e may include items that a user has previously interacted with, e.g., historical interactions between a user and the e-commerce system, for example, one or more prior interactions between the specific user (or a set of users) and the e-commerce platform. In some embodiments, a user interest embedding may also be based on items identified by a user, for example, items that have been identified as favorites by the user, items that have been re-ordered by a user, and/or attributes identified as being user-preferred by the user.

In some embodiments, user interest embeddings may be generated based on non-purchasing user activities. For example, in some embodiments, user interest embeddings may be identified based on user interactions with articles (e.g., identifying dietary attributes based on articles regarding dieting, identifying an organic attribute based on articles about organic foods, etc.). The non-purchasing user activities may include any suitable user activities, including, but not limited to, non-purchasing interactions between the user system 22a and the front-end system 24 and/or any other system.

At step 904, one or more embeddings are generated for each of the received user-associated items 952a-952e. The embedding may be generated according to any suitable method for generating an item and/or attribute embedding. For example, in some embodiments, each embedding layer 954a-954e is configured to generate a combined embedding representative of each attribute associated with and/or identified for an item. The item embedding may include, but is not limited to, a multimodal embedding having a reduced vector set as compared to a vector set consisting of each attribute embedding associated with the item. A process of generating an item embedding is disclosed in U.S. patent application Ser. No. 16/527,411, entitled "PERSONALIZED COMPLIMENTARY ITEM RECOMMENDATIONS USING SEQUENTIAL AND TRIPLE NEURAL ARCHITECTURE," filed concurrently with the present application, the disclosure of which is incorporated by reference herein in its entirety. In other embodiments, attribute embeddings may be generated for each attribute of an item, for example, according to the method illustrated with respect to FIG. 6. At step 906, each of the generated embeddings are provided to an LSTM layer 956a-956e configured to generate a probability score for each of the user-associated items 952a-952e. The LSTM layers 956a-956e may be similar to the bi-directional LSTM layers discussed above in conjunction with FIG. 8, and similar description is not repeated herein.

At step 908, a weighted average of the individual probability scores is generated. For example, in the illustrated embodiment, the output of each embedding layer 954a-954e is provided to an attention layer 960 configured to generate a weighted average of the probability scores (referred to as an attention calculation). The output of the attention layer 960 includes a user representation embedding 962 configured to represent user interest in various items and/or user interest in item attributes. The user representation embedding 962 is configured to maximize the probability of a next clicked/purchased item (t) given the historic user data. In some embodiments, the user representation embedding 962 may be used to calculate and/or is representative of user-item attributes.

In some embodiments, at step 910, the probability of an item being the next-selected and/or next-purchased item is calculated using the user representation embedding 962. In the illustrated embodiment, the user representation embedding 962 is provided to a prediction module 964 configured to implement a prediction calculation, such as, for example, a softmax calculation. The prediction calculation is configured to calculate a compatibility 966 of an item (t) with the user historical data as modeled by the user representation embedding. In some embodiments, a prediction score (P) is calculated for an item according to the equation:

$$P(i_t \mid h) = \text{softmax}\left(\text{score }(i_t, h) = \frac{\exp\{\text{score }(i_t, h)\}}{\sum_{\text{item } i' \text{ in catalog}} \exp\{\text{score }(i't)\}}\right.$$

With reference again to FIG. 13, the user interest representation 804 and the set of query attributes 806, and the set of items 808 are each provided to a trained ranking network 810. For example, in the illustrated embodiment, the trained ranking network 810 includes a learning-to-rank (LeTOR) framework such as support vector machine (SVM), although it will be appreciated that any suitable trained ranking network may be used. The trained ranking network 810 generates a ranked list 812 that includes each item in the item set 808 ranked according to user interest and query attributes.

Although the subject matter has been described in terms of exemplary embodiments, it is not limited thereto. Rather, the appended claims should be construed broadly, to include other variants and embodiments, which may be made by those skilled in the art.

What is claimed is:

1. A system, comprising:
a memory storing instructions; and
one or more processors coupled to the memory, the one or more processors being configured to execute the instructions to:
generate one or more query attributes for a search query received from a computing device of a user by implementing an attribute extraction module configured to:
generate a set of combined word representations;
implement a trained bidirectional recurrent neural network configured to receive the set of combined word representations and generate an output; and
implement a trained conditional random field layer configured to receive the output of the trained bidirectional recurrent neural network and generate attribute values for the one or more query attributes;
based at least in part on historical data of the user including data characterizing one or more items associated with the user, generate relevant item data, the relevant item data characterizing a set of relevant items;
based on the relevant item data, the historical data of the user and the one or more query attributes implement a set of operations that generate a set of personalized search results associated with the search query, the set of operations including:
generating one or more user interest embeddings based at least on the relevant item data and the historical data of the user; and
based on the one or more user interest embeddings and the one or more query attributes, generate data identifying each item of the set of relevant items and corresponding rank.

2. The system of claim 1, wherein generating the one or more user interest embeddings includes combining each of the one or more user interest embeddings with one or more associated attributes.

3. The system of claim 2, wherein the one or more user interest embeddings are each multimodal.

4. The system of claim 2, wherein the one or more processors being configured to execute the instructions further to _generate data characterizing a likelihood of a purchase event associated with one or more items identified in the relevant item data at a future time interval by utilizing at least the one or more user interest embeddings.

5. The system of claim 2, wherein the one or more processors being configured to execute the instructions further to _generate data characterizing a likelihood of a selection event associated with one or more items identified in the relevant item data at a future time interval by utilizing at least the one or more user interest embeddings.

6. The system of claim 1, wherein generating the one or more user interest embeddings includes _generating, for each of the one or more user interest embeddings, data indicating a probability score.

7. The system of claim 1, wherein the one or more processors being configured to execute the instructions further to _generate data identifying each item of the set of relevant items and corresponding rank by utilizing a ranking network.

8. The system of claim 7, wherein the ranking network comprises a learning to rank (LeTOR) framework.

9. The system of claim 1, wherein the historical data includes data identifying one or more items that the user had previously interacted with on an online platform.

10. The system of claim 1, wherein the historical data includes data identifying one or more non-purchasing user interactions of the user with one or more items.

11. A computer-implemented method comprising:
generating one or more query attributes for a search query received from a computing device of a user by implementing an attribute extraction module, wherein the attribute extraction module is configured to:
generate a set of combined word representations;
implement a trained bidirectional recurrent neural network configured to receive the set of combined word representations and generate an output; and
implement a trained conditional random field layer configured to receive the output of the trained bidirectional recurrent neural network and generate attribute values for the one or more query attributes;
based at least in part on historical data of the user including data characterizing one or more items associated with the user, generating relevant item data, the relevant item data characterizing a set of relevant items;
based on the relevant item data, the historical data of the user and the one or more query attributes, implementing a set of operations that generate a set of personalized search results associated with the search query, the set of operations including:
generating one or more user interest embeddings based at least on the relevant item data and the historical data of the user; and
based on the one or more user interest embeddings and the one or more query attributes, generate data identifying each item of the set of relevant items and corresponding rank.

12. The computer-implemented method of claim 11, wherein generating the one or more user interest embeddings includes combining each of the one or more user interest embeddings with one or more associated attributes.

13. The computer-implemented method of claim 12, wherein the one or more user interest embeddings are each multimodal.

14. The computer-implemented method of claim 12, further comprising _generating data characterizing a likelihood of a purchase event associated with one or more items identified in the relevant item data at a future time interval by utilizing at least the one or more user interest embeddings.

15. The computer-implemented method of claim 12, further comprising _generating data characterizing a likelihood of a selection event associated with one or more items identified in the relevant item data at a future time interval by utilizing at least the one or more user interest embeddings.

16. The computer-implemented method of claim 11, wherein generating the one or more user interest embeddings includes _generating, for each of the one or more user interest embeddings, data indicating a probability score.

17. The computer-implemented method of claim 11, further comprising _generating data identifying each item of the set of relevant items and corresponding rank by utilizing a ranking network.

18. The computer-implemented method of claim 17, wherein the ranking network comprises a learning to rank (LeTOR) framework.

19. The computer-implemented method of claim 11, wherein the historical data includes data identifying one or more items that the user had previously interacted with on an online platform.

20. A non-transitory computer-readable medium storing instructions that when executed by one or more processors, cause a computing system to:
    generate one or more query attributes for a search query received from a computing device of a user by implementing an attribute extraction module, wherein the attribute extraction module is configured to:
        generate a set of combined word representations;
        implement a trained bidirectional recurrent neural network configured to receive the set of combined word representations and generate an output; and
        implement a trained conditional random field layer configured to receive the output of the trained bidirectional recurrent neural network and generate attribute values for the one or more query attributes;
    based at least in part on historical data of the user including data characterizing one or more items associated with the user, generate relevant item data, the relevant item data characterizing a set of relevant items;
    based on the relevant item data, the historical data of the user and the one or more query attributes, implement a set of operations that generate a set of personalized search results associated with the search query, the set of operations including:
        generating one or more user interest embeddings based at least on the relevant item data and the historical data of the user; and
        based on the one or more user interest embeddings and the one or more query attributes, generate data identifying each item of the set of relevant items and corresponding rank.

\* \* \* \* \*